(12) United States Patent
Jackson

(10) Patent No.: US 10,380,019 B2
(45) Date of Patent: Aug. 13, 2019

(54) DYNAMICALLY ADJUSTING THE NUMBER OF FLOWS ALLOWED IN A FLOW TABLE CACHE

(71) Applicant: Nicira, Inc., Palo Alto, CA (US)

(72) Inventor: Ethan J. Jackson, San Francisco, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 16/005,506

(22) Filed: Jun. 11, 2018

(65) Prior Publication Data

US 2018/0300244 A1 Oct. 18, 2018

Related U.S. Application Data

(63) Continuation of application No. 14/106,355, filed on Dec. 13, 2013, now Pat. No. 9,996,467.

(51) Int. Cl.
*G06F 12/00* (2006.01)
*G06F 12/0808* (2016.01)
*G06F 12/0895* (2016.01)

(52) U.S. Cl.
CPC ...... *G06F 12/0808* (2013.01); *G06F 12/0895* (2013.01)

(58) Field of Classification Search
None
See application file for complete search history.

(56) References Cited

U.S. PATENT DOCUMENTS

| 5,504,921 A | 4/1996 | Dev et al. |
| 5,550,816 A | 8/1996 | Hardwick et al. |
| 5,729,685 A | 3/1998 | Chatwani et al. |
| 5,751,967 A | 5/1998 | Raab et al. |
| 6,104,699 A | 8/2000 | Holender et al. |
| 6,118,760 A | 9/2000 | Zaumen et al. |
| 6,141,738 A | 10/2000 | Munter et al. |
| 6,219,699 B1 | 4/2001 | McCloghrie et al. |
| 6,442,549 B1 | 8/2002 | Schneider |

(Continued)

FOREIGN PATENT DOCUMENTS

| EP | 1154601 A1 | 11/2001 |
| JP | 2003069609 A | 3/2003 |

(Continued)

OTHER PUBLICATIONS

Author Unknown, "Open vSwitch, An Open Virtual Switch," Dec. 30, 2010, 2 pages, Open vSwitch.

(Continued)

*Primary Examiner* — Baboucarr Faal
(74) *Attorney, Agent, or Firm* — Adeli LLP

(57) ABSTRACT

Some embodiments provide a physical forwarding element that dynamically adjusts the number of flows allowed in a flow table cache. In adjusting, the physical forwarding element initially sets the maximum number of flows allowed in the cache. From the flow table cache, the physical forwarding then iterates through the set maximum number of flows and records the length of time it took to iterate through the flows. Based on the duration, the physical forwarding element then automatically adjusts the size of the flow table cache by increasing or decreasing the number of flows allowed in the cache. Alternatively, the physical forwarding element may choose to keep the cache size the same based on the duration.

18 Claims, 13 Drawing Sheets

(56) References Cited

U.S. PATENT DOCUMENTS

| | | |
|---|---|---|
| 6,456,624 B1 | 9/2002 | Eccles et al. |
| 6,512,745 B1 | 1/2003 | Abe et al. |
| 6,539,432 B1 | 3/2003 | Taguchi et al. |
| 6,574,709 B1 | 6/2003 | Skazinski et al. |
| 6,633,565 B1 | 10/2003 | Bronstein et al. |
| 6,658,002 B1 | 12/2003 | Ross et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,963,585 B1 | 11/2005 | Pennec et al. |
| 6,999,454 B1 | 2/2006 | Crump |
| 7,062,559 B2 | 6/2006 | Yoshimura et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,370 B1 | 1/2009 | Dayal et al. |
| 7,555,002 B2 | 6/2009 | Arndt et al. |
| 7,606,260 B2 | 10/2009 | Oguchi et al. |
| 7,633,955 B1 | 12/2009 | Saraiya et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,808,929 B2 | 10/2010 | Wong et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,606 B2 | 10/2011 | Memon et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,161,270 B1 | 4/2012 | Parker et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,351,418 B2 | 1/2013 | Zhao et al. |
| 8,456,984 B2 | 6/2013 | Ranganathan et al. |
| 8,504,718 B2 | 8/2013 | Wang et al. |
| 8,571,031 B2 | 10/2013 | Davies et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,644,188 B1 | 2/2014 | Brandwine et al. |
| 8,762,501 B2 | 6/2014 | Kempf et al. |
| 8,838,743 B2 | 9/2014 | Lewites et al. |
| 9,036,636 B1 | 5/2015 | Sherwood et al. |
| 9,042,234 B1 | 5/2015 | Liljenstolpe et al. |
| 9,203,771 B1 | 12/2015 | Cai et al. |
| 9,244,843 B1 | 1/2016 | Michels et al. |
| 9,569,368 B2 | 2/2017 | Jackson |
| 9,602,398 B2 | 3/2017 | Pettit et al. |
| 9,674,087 B2 | 6/2017 | Jackson et al. |
| 9,680,738 B2 | 6/2017 | Jackson et al. |
| 9,680,748 B2 | 6/2017 | Jackson et al. |
| 9,686,185 B2 | 6/2017 | Shelly et al. |
| 9,686,200 B2 | 6/2017 | Pettit et al. |
| 2001/0043614 A1 | 11/2001 | Viswanadham et al. |
| 2002/0089931 A1 | 7/2002 | Takada et al. |
| 2002/0091802 A1 | 7/2002 | Paul et al. |
| 2002/0093952 A1 | 7/2002 | Gonda |
| 2002/0194369 A1 | 12/2002 | Rawlins et al. |
| 2003/0014568 A1 | 1/2003 | Kishi et al. |
| 2003/0041170 A1 | 2/2003 | Suzuki |
| 2003/0058850 A1 | 3/2003 | Rangarajan et al. |
| 2003/0214948 A1 | 11/2003 | Jin et al. |
| 2004/0016000 A1 | 1/2004 | Zhang et al. |
| 2004/0073659 A1 | 4/2004 | Rajsic et al. |
| 2004/0098505 A1 | 5/2004 | Clemmensen |
| 2004/0186914 A1 | 9/2004 | Shimada |
| 2004/0225638 A1 | 11/2004 | Geiselhart et al. |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0111445 A1 | 5/2005 | Wybenga et al. |
| 2005/0120160 A1 | 6/2005 | Plouffe et al. |
| 2005/0182853 A1 | 8/2005 | Lewites et al. |
| 2005/0192922 A1 | 9/2005 | Edlund et al. |
| 2005/0220096 A1 | 10/2005 | Friskney et al. |
| 2006/0002370 A1 | 1/2006 | Rabie et al. |
| 2006/0026225 A1 | 2/2006 | Canali et al. |
| 2006/0029056 A1 | 2/2006 | Perera et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0221961 A1 | 10/2006 | Basso et al. |
| 2006/0291388 A1 | 12/2006 | Amdahl et al. |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0156919 A1 | 7/2007 | Potti et al. |
| 2007/0192543 A1 | 8/2007 | Naik et al. |
| 2007/0260721 A1 | 11/2007 | Bose et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0159301 A1 | 7/2008 | Heer |
| 2008/0240095 A1 | 10/2008 | Basturk |
| 2009/0039884 A1 | 2/2009 | Schiano et al. |
| 2009/0138577 A1 | 5/2009 | Casado et al. |
| 2009/0150527 A1 | 6/2009 | Tripathi et al. |
| 2009/0161547 A1 | 6/2009 | Riddle et al. |
| 2009/0292858 A1 | 11/2009 | Lambeth et al. |
| 2009/0300340 A1 | 12/2009 | Chou et al. |
| 2010/0131636 A1 | 5/2010 | Suri et al. |
| 2010/0214949 A1 | 8/2010 | Smith et al. |
| 2010/0232435 A1 | 9/2010 | Jabr et al. |
| 2010/0254385 A1 | 10/2010 | Sharma et al. |
| 2010/0275199 A1 | 10/2010 | Smith et al. |
| 2010/0306408 A1 | 12/2010 | Greenberg et al. |
| 2011/0022695 A1 | 1/2011 | Dalal et al. |
| 2011/0075664 A1 | 3/2011 | Lambeth et al. |
| 2011/0085557 A1 | 4/2011 | Gnanasekaran et al. |
| 2011/0085559 A1 | 4/2011 | Chung et al. |
| 2011/0085563 A1 | 4/2011 | Kotha et al. |
| 2011/0128959 A1 | 6/2011 | Bando et al. |
| 2011/0153908 A1 | 6/2011 | Schaefer et al. |

(56) References Cited

U.S. PATENT DOCUMENTS

| | | |
|---|---|---|
| 2011/0164503 A1 | 7/2011 | Yong et al. |
| 2011/0194567 A1 | 8/2011 | Shen |
| 2011/0202920 A1 | 8/2011 | Takase |
| 2011/0261825 A1 | 10/2011 | Ichino |
| 2011/0299413 A1 | 12/2011 | Chatwani et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0317559 A1 | 12/2011 | Kern et al. |
| 2012/0054445 A1 | 3/2012 | Swart et al. |
| 2012/0079478 A1 | 3/2012 | Galles et al. |
| 2012/0096225 A1 | 4/2012 | Khawand et al. |
| 2012/0182992 A1 | 7/2012 | Cowart et al. |
| 2013/0024579 A1 | 1/2013 | Zhang et al. |
| 2013/0054761 A1 | 2/2013 | Kempf et al. |
| 2013/0058346 A1 | 3/2013 | Sridharan et al. |
| 2013/0163427 A1 | 6/2013 | Beliveau et al. |
| 2013/0163475 A1 | 6/2013 | Beliveau et al. |
| 2013/0339544 A1 | 12/2013 | Mithyantha |
| 2014/0019639 A1 | 1/2014 | Ueno |
| 2014/0098669 A1 | 4/2014 | Garg et al. |
| 2014/0115578 A1 | 4/2014 | Cooper et al. |
| 2014/0226661 A1 | 8/2014 | Mekkattuparamban et al. |
| 2014/0233421 A1 | 8/2014 | Matthews |
| 2014/0280822 A1 | 9/2014 | Chennimalai Sankaran et al. |
| 2014/0369348 A1 | 12/2014 | Zhang et al. |
| 2015/0169451 A1 | 6/2015 | Jackson |
| 2015/0281125 A1 | 10/2015 | Koponen et al. |
| 2017/0171065 A1 | 6/2017 | Pettit et al. |
| 2017/0237664 A1 | 8/2017 | Jackson et al. |

FOREIGN PATENT DOCUMENTS

| | | |
|---|---|---|
| JP | 2003124976 A | 4/2003 |
| JP | 2003318949 A | 11/2003 |
| WO | 2012126488 A1 | 9/2012 |
| WO | 2014126387 A1 | 8/2014 |
| WO | 2015038198 A1 | 3/2015 |

OTHER PUBLICATIONS

Author Unknown, "OpenFlow Switch Specification, Version 0.9.0 (Wire Protocol 0x98)," Jul. 20, 2009, 36 pages, Open Networking Foundation.

Author Unknown, "OpenFlow Switch Specification, Version 1.0.0 (Wire Protocol 0x01)," Dec. 31, 2009, 42 pages, Open Networking Foundation.

Author Unknown, "OpenFlow Switch Specification, Version 1.1.0 Implemented (Wire Protocol 0x02)," Feb. 28, 2011, 56 pages, Open Networking Foundation.

Curtis, Andrew R., et al., "DevoFlow: Scaling Flow Management for High-Performance Networks," SIGCOMM '11, Aug. 15-19, 2011, 12 pages, ACM, Toronto, Ontario, Canada.

Das, Saurav, et al., "Simple Unified Control for Packet and Circuit Networks," Month Unknown, 2009, 2 pages, IEEE.

Das, Saurav, et al., "Unifying Packet and Circuit Switched Networks with OpenFlow," Dec. 7, 2009, 10 pages, Stanford University.

Fernandes, Natalia C., et al., "Virtual Networks: Isolation, Performance, and Trends," Annals of Telecommunications, Oct. 7, 2010, 17 pages, vol. 66, Institut Télécom and Springer-Verlag, Paris, France.

Foster, Nate, et al. "Frenetic: A Network Programming Language," ICFP '11, Sep. 19-21, 2011, 13 pages, Tokyo, Japan.

Koponen, Teemu, et al., "Network Virtualization in Multi-tenant Datacenters," Technical Report TR-2013-001E, Aug. 2013, 22 pages, VMware, Inc., Palo Alto, CA, USA.

McKeown, Nick, et al., "OpenFlow: Enabling Innovation in Campus Networks," ACS SIGCOMM Computer Communication Review, Apr. 2008, 6 pages, vol. 38, No. 2.

Nygren, Anders, et al., "OpenFlow Switch Specification," Version 1.4.0 (Wire Protocol 0x05), Oct. 14, 2013, 206 pages, The Open Networking Foundation.

Nygren, Anders, et al., OpenFlow Switch Specification, Version 1.3.4 (Protocol version 0x04), Mar. 27, 2014, 84 pages, Part 1 of 2, Open Networking Foundation.

Nygren, Anders, et al., OpenFlow Switch Specification, Version 1.3.4 (Protocol version 0x04), Mar. 27, 2014, 87 pages, Part 2 of 2, Open Networking Foundation.

Pettit, Justin, et al., "Virtual Switching in an Era of Advanced Edges," In Proc. 2nd Workshop on Data Center-Converged and Virtual Ethernet Switching (DCCAVES), Sep. 2010, 7 pages, vol. 22. ITC.

Pfaff, Ben, et al., "OpenFlow Switch Specification," Version 1.3.1 (Wire Protocol 0x04), Sep. 6, 2012, 128 pages, The Open Networking Foundation.

Sherwood, Rob, et al., "FlowVisor: A Network Virtualization Layer,"OPENFLOW-TR-2009-1, Oct. 14, 2009, 15 pages, OpenFlow.

Tung, Ye, et al., "A flow caching mechanism for fast packet forwarding," Computer Communications, Apr. 19, 2001, 6 pages, Elsevier.

Zadnik, Martin, et al., "Evolution of Cache Replacement Policies to Track Heavy-hitter Flows," ANCS'10, Oct. 25-26, 2010, 2 pages, ACM, La Jolla, CA, USA.

Matsumoto, Nobutaka, et al., "LightFlow: Speeding Up GPU-based Flow Switching and Facilitating Maintenance of Flow Table," 2012 IEEE 13th International Conference on High Performance Switching and Routine, Jun. 24, 2012, 6 pages, IEEE.

DYNAMICALLY ADJUSTING THE NUMBER OF FLOWS ALLOWED IN A FLOW TABLE CACHE

CLAIM OF BENEFIT TO PRIOR APPLICATIONS

This application is a continuation application of U.S. patent application Ser. No. 14/106,355, filed Dec. 13, 2013, and now published as U.S. Patent Publication 2015/0169451. U.S. patent application Ser. No. 14/106,355, now published as U.S. Patent Publication 2015/0169451 is incorporated herein by reference.

BACKGROUND

Many current enterprises have large and sophisticated networks comprising switches, hubs, routers, servers, workstations and other network devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual components.

In response, there is a growing movement, driven by both industry and academia, towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Typically, the shared network switching elements are software switching elements. A software switching element brings many features that are standard in a hardware switch to virtualized environments. The software switching element can also be more flexible than the hardware switch. For instance, the software switching element can be programmed to emulate a traditional switch pipeline or can be programmed to extend for new models.

One of the main challenges in developing such a software switching element is performance. A hardware switch has application-specific integrated circuits (ASICs) that are specifically designed to support in-hardware forwarding. The problem with a software switching element is that it operates on a host (e.g., x86 box), such as a hypervisor. Thus, methods for increasing the performance of the software switching element are needed.

BRIEF SUMMARY

Some embodiments provide a physical forwarding element that dynamically adjusts the number of flows allowed in a flow table cache. In adjusting, the physical forwarding element initially sets the maximum number of flows allowed in the cache. From the flow table cache, the physical forwarding then (1) iterates through the set maximum number of flows and (2) records the length of time (i.e., the duration) it took to iterate through the flows. Based on the duration, the physical forwarding element then automatically adjusts the size of the flow table cache by increasing or decreasing the number of flows allowed in the cache. Alternatively, the physical forwarding element may choose to keep the cache size the same based on the duration.

In some embodiments, the amount of change in the cache size is directly related to length of the duration. As an example, the physical forwarding element might only decrease the size of the cache if the duration is substantially over the optimal time, or only increase the size of the cache if the duration is substantially under the optional time. As another example, the physical forwarding element might change the cache size in accord with how much the duration is over or under the optimal time for iterating through the set maximum number of flows. That is, the physical forwarding element might only slightly decrease the size of the cache if the duration is over the optimal time but not substantially over the optimal time, or might only slightly increase the size of the cache if the duration is under the optimal time but not substantially under the optimal time.

In iterating through the flows, the physical forwarding element of some embodiments performs a set of operations on each flow in the cache. The set of operations can include validating the flow to determine if the flow is still valid. In some embodiments, the validation entails checking the flow in the cache against one or more flow entries in a set of flow tables. For instance, the physical forwarding element may compare a set of match fields of a flow in the datapath cache against a set of match fields of a flow entry in a flow table. The physical forwarding element compares the sets of match fields to determine if they match one another. If the sets match one another, the physical forwarding element validates the flow in the cache by determining whether the flow in the cache and the flow entry in the flow table are associated with the same result, meaning the same set of actions.

If the results are the same, the physical forwarding element of some embodiments retains the flow in the datapath cache. If the results are not the same, the physical forwarding element of some embodiments deletes the flow from the cache. Alternatively, if the results are not the same, the physical forwarding element of some embodiments updates the flow in the datapath cache. That is, instead of removing the flow, the physical forwarding element of some embodiments changes the set of actions associated with the flow to match a set of actions associated with the matching flow entry from a flow table.

In conjunction with the validation or instead of it, the physical forwarding element of some embodiments performs one or more other operations when iterating through the flows. The operations include a flow eviction process to remove flow from the cache. The flow eviction process of some embodiments determines if a flow in the datapath has expired and, if so, removes the flow from the cache. For instance, if the flow has been in the cache for a set period of time or has not been used for a set period of time, the physical forwarding element may delete the flow from the datapath cache. In some embodiments, the physical forwarding element makes the decisions about how long a flow stays in the cache based on how recently it was used and/or the amount of flows in the datapath cache.

In some embodiments, the physical forwarding element performs a set of statistics related operations on a flow. The physical forwarding element may examine a packet counter and/or a byte counter associated with the flow. In addition, the physical forwarding element may update the packet counter and/or the byte counter. For instance, the physical forwarding element may increment one or both the packet counter and the byte counter.

The physical forwarding element of some embodiments installs flows in the cache and uses the flows to process packets. In addition, the physical forwarding element iterates through each flow and validates the flow. In some embodiments, the physical forwarding element performs the installation and validation operations in a multi-threaded manner. The physical forwarding element in some such embodiments includes (1) a set of one or more upcall handlers to install flows in the cache and (2) a set of one or more revalidators to validate the flows in the cache. In its own thread, an upcall handler may run independently of each revalidator in the set of revalidators. In another thread, a revalidator may run independently of each upcall handler and each other revalidator.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
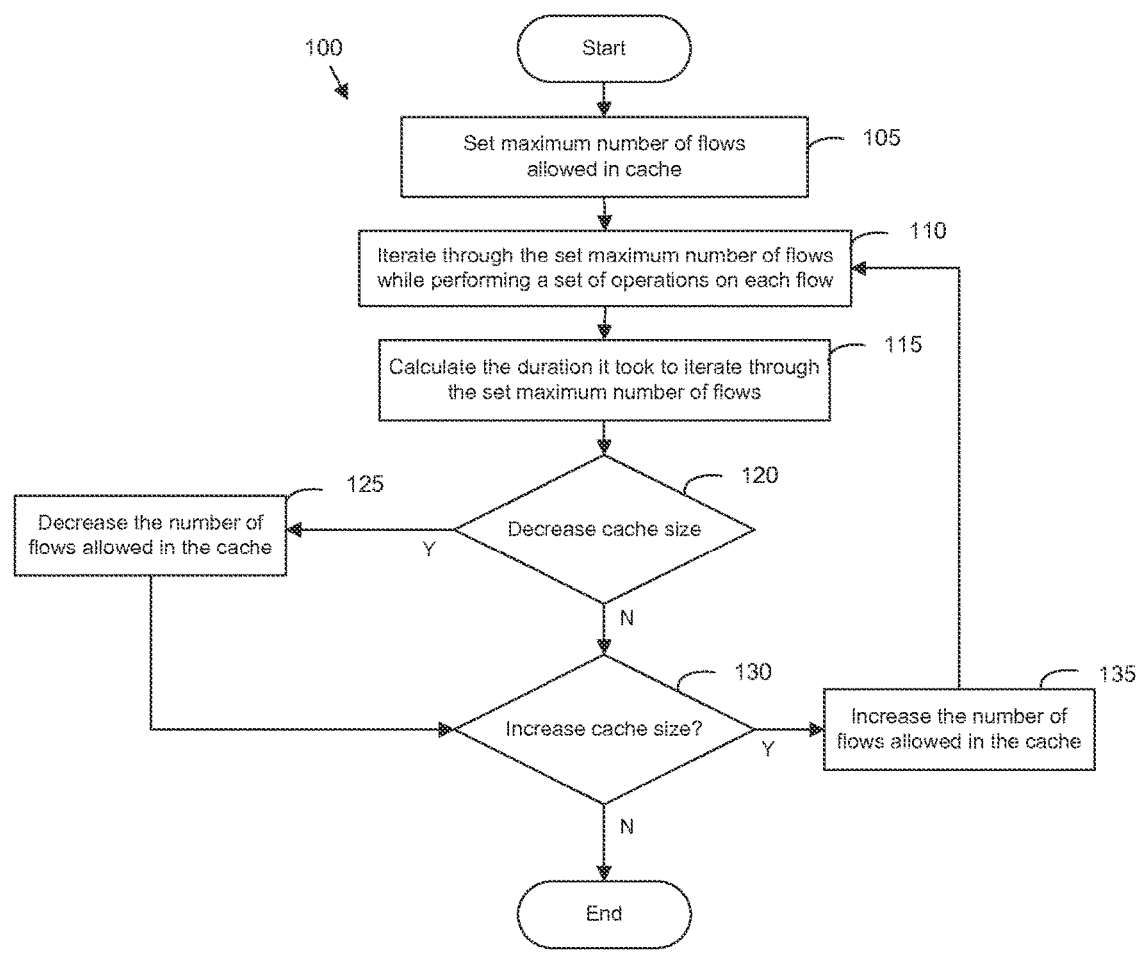
FIG. 1 conceptually illustrates a process that some embodiments use to dynamically adjust the size of a flow table cache.

Embodiments described herein provide a physical forwarding element that dynamically adjusts the number of flows allowed in a flow table cache. FIG. 1 conceptually illustrates a process 100 that some embodiments use to dynamically adjust the size of a flow table cache. In some embodiments, the process 100 is performed by the physical forwarding element. The process 100 begins by initially setting (at 105) the cache size. Here, the process 100 might choose some number as the maximum number of flows that are allowed in the cache. For instance, the process might start by specifying an arbitrary low number of flows (e.g., 5000 flows or some other number) as the size of the datapath cache.

The process 100 then iterates (at 110) through the through the flows in the flow table cache. In iterating, the process 100 of some embodiments performs a set of operations on each flow in the cache. The set of operations can include validating the flow to determine if the flow remains valid. The set of operations can include performing accounting work, such as examining and updating packet counter and/or byte counter that are associated with the flow. The set of operations can include identifying when the flow was last used and dumping the flow from the cache if the flow has not been used in some time.

As shown in FIG. 1, the process 100 calculates (at 115) the length of time (i.e., the duration) it took to iterate through the set number of flows in the cache. In some embodiments, the process 100 calculates the duration by recording start and end time of the iteration, and subtracting the end time from the start time. Alternatively, the process 100 of some embodiments obtains the duration by maintaining a timer when iterating through the flows in the cache.

Based on the duration, the process 100 then determines (at 120) whether the cache size should be decreased. If so, the process 100 reduces (at 125) the number of flows allowed in the cache. Otherwise, the process 100 proceeds to 130, which is described below. At 130, the process 100 determines whether the cache size should be increased based on the duration. If so, the process 100 increases (at 135) the number of flows allowed in the cache. The process then returns to 110, which was described above. In some embodiments, the process 100 returns to 110 so that it can do another iteration of the flows. In this way, the process can stabilize on a reasonable datapath flow cache size.

The process of some embodiments uses an additive-increase/multiplicative-decrease (AIMD) algorithm to dynamically adjust the cache size. For instance, if the duration the duration was some milliseconds (e.g., 500 ms), the process might perform an additive increase operation that bumps the flow limit from one number (e.g., 50000) to another number (e.g., 6000). On the other hand, if it took a significant amount of time to loop through the flows, the process might perform multiplicative decrease operation that reduces the number of flows by some factor (e.g., ½, ⅓, ¼ or some other factor).

In some embodiments, the amount change in the cache size is directly related to length of the duration. As an example, the process 100 might only decrease the size of the cache if the duration is substantially over the optimal time, or only increase the size of the cache if the duration is substantially under the optional time. As another example, the process 100 might change the cache size in accord with how much the duration is over or under the optimal time for iterating through the set maximum number of flows. That is, the process might only slightly decrease the size of the cache if the duration is over the optimal time but not substantially over the optimal time, or might only slightly increase the size of the cache if the duration is under the optimal time but not substantially under the optimal time.

By dynamically adjusting the size of the cache, the process 100 of some embodiments makes full use of the specifications of the device (e.g., the host) on which the forwarding element operates. For instance, the number of flows that a physical forwarding element depends at least partially on its specifications, such as the amount of memory the device has, the speed of the its central processing unit (CPU), the number of cores that the CPU has, etc.

In a previous solution, the physical forwarding element is associated with an arbitrarily number as the flow eviction threshold. If the number of flows in the cache reaches this limit, then unused flows would be removed from the cache. This has a couple of problems. First, there is no hard limit on the number of flows in the cache. This means that, in some circumstances, the number of flows in the cache could grow much larger than the physical forwarding element could handle, which in turn causes performance degradation. For this reason, the previous solution kept the flow eviction threshold much lower than it could be; thereby, preventing the physical forwarding element from fully utilizing the datapath cache in accord with its capabilities.

As shown in FIG. 1, if it is determined (at 130) that the cache size should not be increased, the process 100 retains the current cache size. The process 100 then ends. Some embodiments perform variations on the process 100. The specific operations of the process 100 may not be performed in the exact order shown and described. The specific operations may not be performed in one continuous series of operations, and different specific operations may be performed in different embodiments. For instance, the ordering of the operations 120 and 130 is arbitrary, as the process 100 might first determine if the cache size should be increased prior to determining if the cache size should be decreased.

The physical forwarding element of some embodiments installs flows in the cache and uses the flows to process packets. In addition, the physical forwarding element iterates through each flow and validates the flow. In some embodiments, the physical forwarding element performs the installation and validation operations in a multi-threaded manner. The physical forwarding element in some such embodiments includes (1) a set of one or more upcall handlers to install flows in the cache and (2) a set of one or more revalidators to validate the flows in the cache. In its own thread, an upcall handler may run independently of each revalidator in the set of revalidators. In another thread, a revalidator may run independently of each upcall handler and each other revalidator. In short, the core idea here is the separation of the installation of flows in the cache and the management of the flows in the cache. Previous solutions combined the installation and the management aspect. So, the main thread would install and validate the flows in the cache.

Figure 2:
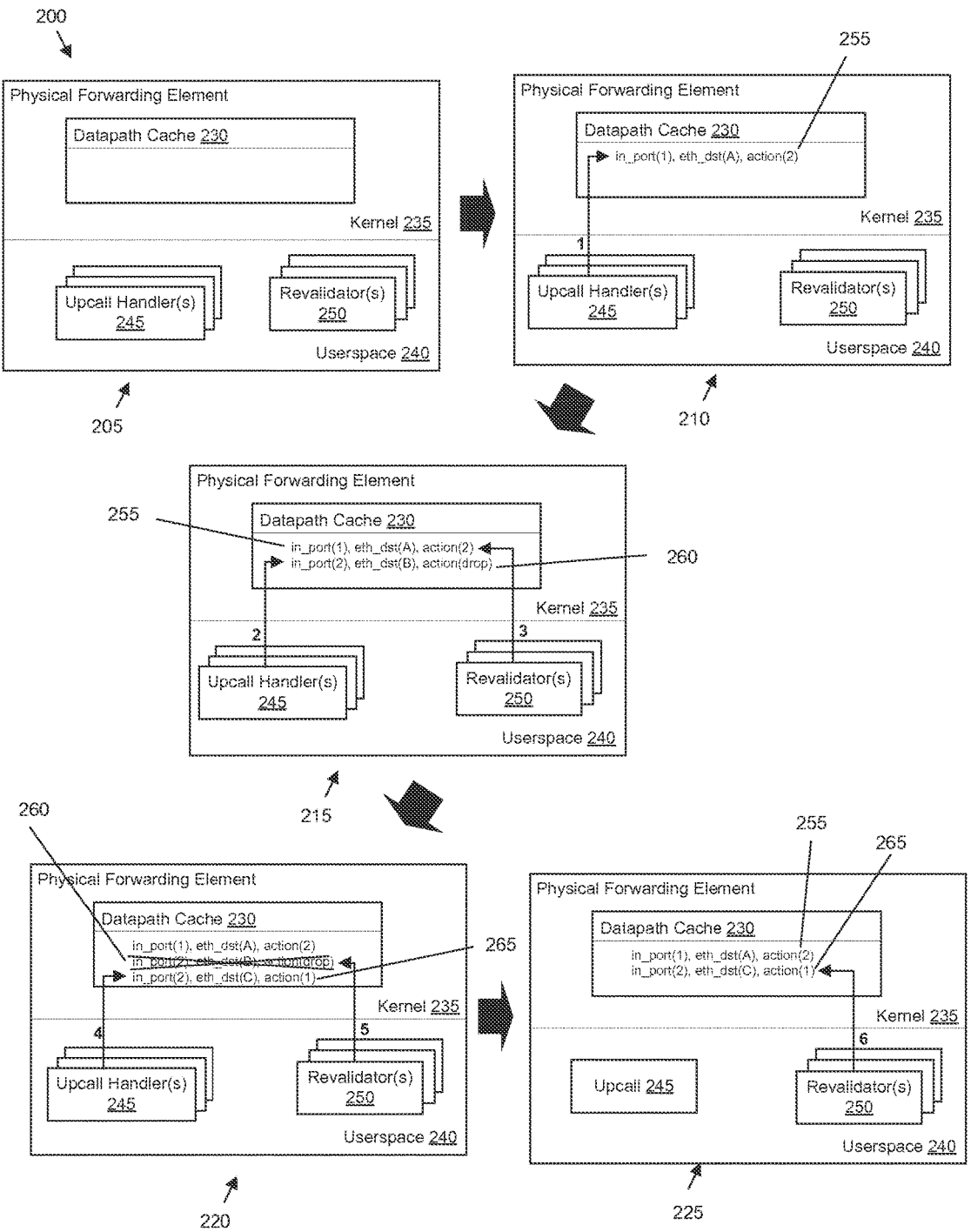
FIG. 2 illustrates an example of a physical forwarding element that utilizes multiple threads to install and validate flows in a flow table cache.

FIG. 2 illustrates an example of a physical forwarding element 200 that utilizes multiple threads to install and validate flows in a datapath cache 230. Particularly, the figure shows in five operational stages 205-225 how the physical forwarding element 200 can independently install and validate flows in the cache. As shown, the physical forwarding element 200 includes a set of upcall handlers 245 and a set of revalidators 250. In this example, the set of upcall handlers 245 and the set of revalidator 250 are components that execute on the userspace 240 to manage flows stored in the datapath cache 230 of the kernel 235. In some embodiments, the kernel 235 is the most basic component of an operating system that runs on a separate memory space and is responsible for managing system resources (e.g., communication between hardware and software resources). In contrast, the userspace 240 is a memory space where all user mode applications may run.

In some embodiments, when the physical forwarding element 200 receives a packet, it first checks the datapath cache 230 to determine if there is a flow that matches the packet. The physical forwarding element 200 may iterate through a number of flows in the datapath cache before finding one matching flow. If there is one, the physical forwarding element 200 processes the packet using the flow's associated action. For example, depending on the rule, the physical forwarding element 200 might drop the packet or output the packet to one or more of its output ports.

If there is a miss in the datapath cache 230, the control is shifted from the kernel 235 to the userspace 240. The control is shifted so that a translation can occur at the userspace 240 to generate and push a flow to kernel 235. In some embodiments, an upcall handler is responsible for handling such a case when there is no matching flow in the datapath cache 230. For instance, if there is a miss in the cache, a dispatcher (not shown) receives the flow miss, chooses an upcall handler, and hands the miss off to the handler for processing and installation.

The set of upcall handlers 245 of some embodiments installs flows in the datapath cache 235 based on one or more flow entries from a set of one or more flow tables (not shown). The set of flow tables are maintained in the userspace 240, in some embodiments. When there is a miss in the cache 230, an upcall handler may install a rule in the cache based on a flow entry from a flow table. In this manner, the physical forwarding element 200 can quickly process each subsequent packet with the same set of header values using the rule in the cache 230. The datapath cache 230 provides a fast path to process incoming packets because it does not involve any translation at the userspace 240.

As shown in FIG. 2, the physical forwarding element 200 of some embodiments includes a set of revalidators 250. As mentioned above, each revalidator operates independently of each upcall handler and each other revalidator to validate one or more flows in the datapath cache 230. In some embodiments, the validation entails checking the flow in the datapath cache 230 against one or more flow entries in the set of flow tables. For instance, a revalidator may compare a set of match fields of a flow in the datapath cache against a set of match fields of a flow entry in the flow table. The revalidator compares the sets of match fields to determine if they match one another. If the sets match one another, the revalidator validates the flow in the datapath cache by determining whether the flow in the datapath cache and the flow entry in the flow table are associated with the same result, meaning the same set of actions. If the results are the same, the revalidator of some embodiments retains the flow in the datapath cache. If the results are not the same, the revalidator of some embodiments removes the flow from the datapath cache 230. Alternatively, if the results are not the same, the revalidator of some embodiments updates the flow in the datapath cache. That is, instead of removing the flow, the revalidator of some embodiments changes the set of actions associated with the flow to match a set of actions associated with the matching flow entry from a flow table.

In conjunction with the validation or instead of it, the revalidator of some embodiments performs one or more other operations when iterating through the flows. The operations include a flow eviction process to remove flow from the datapath cache 230. The flow eviction process of some embodiments determines if a flow in the datapath has expired and, if so, removes the flow from the datapath cache. For instance, if the flow has been in the cache for a set period of time or has not been used for a set period of time, the revalidator may delete the flow from the datapath cache. This feature prevents the datapath cache from being filled with potentially many flows that has not been used for some time.

In some embodiments, the flows eviction process takes into account the number of flows that are stored in the datapath cache 230. As an example, if the physical forwarding element 200 is not heavily loaded, a flow will stay in the cache if it was not used within a particular time period (e.g., three thousand or five thousand milliseconds). If the flow was not used within the particular time period, the flow may be dropped from the cache 230. Once the flows in the datapath cache 230 reaches a certain threshold number, the physical forwarding element 200 may change how long a flow stays in the cache. For example, if the cache is heavily loaded, a flow might only last some milliseconds (e.g., a hundred milliseconds) if it was not used. In some embodiments, a userspace component makes the decisions about how long a flow stays in the cache 230 by taking into account how recently the flow was used and/or the amount of flows in the datapath cache.

In some embodiments, the physical forwarding element 200 performs a set of statistics related operations on a flow. The revalidator may examine a packet counter and/or a byte counter associated with the flow. The revalidator may also update the packet counter and/or the byte counter. For instance, the revalidator may increment one or both the packet counter and the byte counter.

In addition to the set of revalidators 250, the physical forwarding element 200 of some embodiments includes a flow dumper (not shown) that runs independently of each upcall handler and each revalidator to iterate through each flow in the datapath cache and assign the flow to a revalidator. The flow dumper of some embodiments facilitates multi-threaded operations by assigning different flows from the datapath cache to different revalidators. For instance, the flow dumper might assign a first flow from the datapath cache to a first revalidator and assign a second flow to a second revalidator. In different threads, the first and second revalidators might execute on the physical forwarding element 200 at least partially at the same time.

Having described several example components of the physical forwarding element 200, an example operation of these components will now be described by reference to the five stages 205-225 that are shown in FIG. 2. The first stage 205 illustrates the physical forwarding element 200 with no flows in the datapath cache 230. The datapath cache 230 might be empty because the physical forwarding element 200 has not received any packet, or one or more of the flows in the cache has expired. Here, an upcall handler operates as a thread to handle flow misses in the kernel 235.

The second stage 210 shows the physical forwarding element 200 after receiving a packet and finding no matching flow in the datapath cache 230. An upcall handler has been called to install a flow in the datapath cache 230 to handle such a packet (e.g., with the same set of header values). In some embodiments, when there is no matching flow in the datapath cache 230, the packet is sent to the upcall handler. The upcall handler then uses the packet to find one or more matching flows in a set of one or more flow tables. If a match is found, the upcall handler sends the packet back to a component of the kernel 235 with instructions to perform a set of actions. The upcall handler also pushes a flow to the datapath cache 230 to process each subsequent packet with the same set of packet header values.

In the second stage 210, the upcall handler stores a flow 255 in the datapath cache 235 to process packets. The flow 255 includes a set of match fields and an action to perform on each packet that have a set of header values that match the set of match fields. To simplify the description, the flow 255 includes only includes two match fields, namely ingress port and destination Ethernet address. The action of the flow specifies outing each packet that matches the set of match fields to port two. In some embodiments, the physical forwarding element allows multiple actions to be associated with one flow.

The third stage 215 shows the physical forwarding element 200 after receiving another packet with a different set of header values and finding no matching flow in the datapath cache 235 to process the packet. Similar to the second stage 210, the upcall handler has been called to install a flow in the datapath cache 235 to handle such a packet. As shown in the third stage 215, the upcall handler stores another flow 260 in the datapath cache 235. The flow 260 specifies dropping any packet that is received through ingress port two and has the matching destination Ethernet address.

The third stage 215 also shows an example of how the physical forwarding element 200 operates in a multi-threaded manner to manage flows in the datapath cache 235. Specifically, the upcall handler operates in its own thread to handle flow misses in the datapath cache 235. When a flow is installed in the cache, a revalidator operates independently of the upcall handler to perform a set of operations on the flow (e.g., to validate the flow, to evict the flow if it has expired, etc.). This is show in the third stage 215 with one revalidator in the set of the revelators 250 performing the set of operation on the flow 255 in the datapath cache 235. Here, the revalidator has validated the flow 255 and did not remove it from the datapath cache. In some embodiments, the revalidator starts the validation upon a flow being installed in the cache or when triggered (e.g., when a set number of flows are installed in the cache).

The fourth stage 220 is similar to the third stage 215. In response to finding no matching flow for a packet, the upcall handler installs another flow 265 in the datapath cache 235. Independently of each upcall handler, the same revalidator or another revalidator performs the set of operations on the second flow 260 in the datapath cache 235. However, different from the third stage 215, the revalidator has found the flow to be invalid and proceeds to remove the flow from the datapath cache 235. This is conceptually shown with the flow 260 being crossed out in the datapath cache 235. There can be various reasons why a flow in the cache becomes invalid. For example, a flow outputting traffic to that a particular port may become invalid if a machine (e.g., a virtual machine) is no longer attached to that particular port. Also, a flow can become invalid if there are new forwarding instructions that are programmed onto the physical forwarding element (e.g., from a network controller).

The fifth stage 225 shows the shows the physical forwarding element 200 after the revalidator has removed the flow 260 from the datapath cache 235. Accordingly, instead of three flows, the datapath cache 235 now includes only two flows 255 and 265. In this fifth stage 225, a revalidator is performs the set of operations on the last flow. Here, the revalidator has validated the flow 265 and does not delete the flow from the datapath cache 235.

Many more example operations of such a physical forwarding element are described below. However, before describing these operations, Section I describes an example physical forwarding elements according to some embodiments. Section II then describes a more detailed example of how the physical forwarding element processes packets. This is followed by Section III that describes various examples of how the physical forwarding element of some embodiments dynamically adjusts the cache size on the fly. Section IV then describes several examples of validating flows. Lastly, Section V describes an electronic system for implementing some embodiments of the invention.

I. Example Physical Forwarding Element

The physical forwarding element of some embodiments installs flows in the cache and uses the flows to process packets. In addition, the physical forwarding element iterates through each flow and validates the flow. In some embodiments, the physical forwarding element performs the installation and validation operations in a multi-threaded manner. To optimize performance, the physical forwarding element may dynamically adjust the number of flows allowed in a flow table cache. An example of such a physical forwarding element will now be described by reference to FIG. 3.

Figure 3:
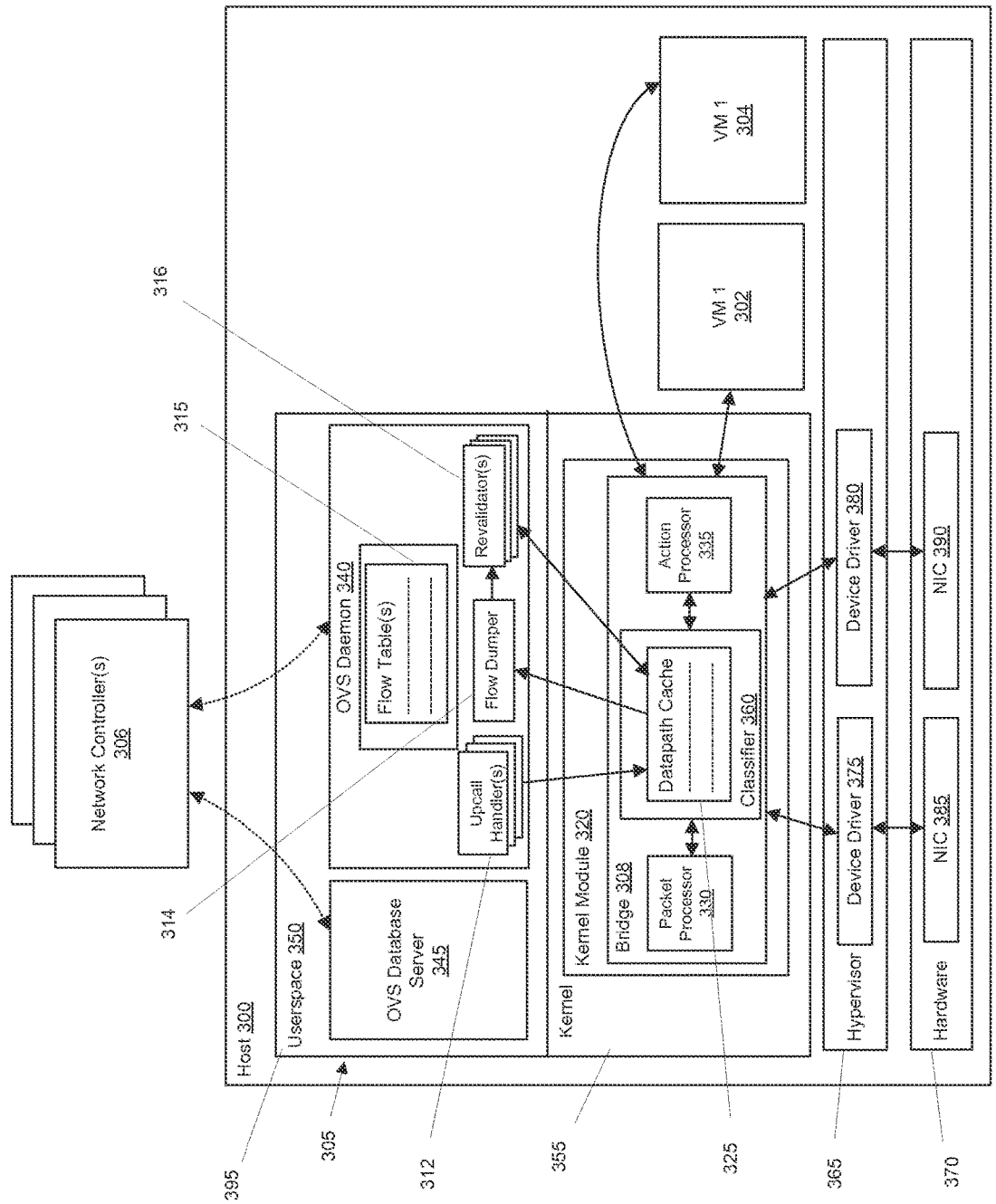
FIG. 3 conceptually illustrates an architectural diagram of a physical forwarding element of some embodiments.

FIG. 3 conceptually illustrates an architectural diagram of a physical forwarding element 305 of some embodiments that is implemented in a host 300. In some embodiments, the physical forwarding element is a software forwarding element that execute on the host device. The physical forwarding element 305 of some embodiments operates in conjunction with one or more other physical forwarding elements to collectively implement different logical forwarding elements (e.g., logical switches, logical routers, etc.) for different logical networks of different tenants, users, departments, etc. that use the same shared computing and networking resources. The physical forwarding element 305 may be referred to a physical switching element, in some embodiments.

In this example, the physical forwarding element 305 operates on a virtual machine (VM) 395 and includes several components. These components includes an Open vSwitch (OVS) kernel module 320, which runs in the kernel 355 of the VM 355, and an OVS daemon 340 and an OVS database server 345, which run in the userspace 350 of the VM 395. The OVS daemon includes a set of one or more upcall handlers 312, a flow dumper 314, and a set of one or more revalidators 316.

As shown in FIG. 3, the host 300 includes hardware 370, hypervisor 365, and VMs 302 and 304. The hardware 370 may include typical computer hardware, such as processing units, volatile memory (e.g., random access memory (RAM)), nonvolatile memory (e.g., hard disc drives, optical discs, etc.), network adapters, video adapters, or any other type of computer hardware. As shown, the hardware 370 includes NICs 385 and 390, which are typical network interface controllers for connecting a computing device to a network.

The hypervisor 365 is a software abstraction layer that runs on top of the hardware 370 and runs below any operation system. The hypervisor 365 handles various management tasks, such as memory management, processor scheduling, or any other operations for controlling the execution of the VMs 302 and 304. Moreover, the hypervisor 365 communicates with the VM 395 to achieve various operations (e.g., setting priorities). In some embodiments, the hypervisor 365 is one type of hypervisor (Xen, ESX, or KVM hypervisor) while, in other embodiments, the hypervisor 365 may be any other type of hypervisor for providing hardware virtualization of the hardware 370 on the host 300.

As shown, the hypervisor 365 includes device drivers 375 and 380 for the NICs 385 and 390, respectively. The device drivers 375 and 380 allow an operating system to interact with the hardware of the host 300. VMs 302 and 304 are virtual machines running on the hypervisor 365. As such, the VMs 302 and 304 run any number of different operating systems. Examples of such operations systems include Linux, Solaris, FreeBSD, or any other type of UNIX based operating system. Other examples include Windows based operating systems as well.

In some embodiments, the VM 395 is a unique virtual machine, which includes a modified Linux kernel, running on the hypervisor 365. In such cases, the VM 395 may be referred to as domain 0 or dom0 in some embodiments. The VM 395 of such embodiments is responsible for managing and controlling other VMs running on the hypervisor 365 (e.g., VMs 390 and 395). For instance, the VM 395 may have special rights to access the hardware 370 of the host 300. In such embodiments, other VMs running on the hypervisor 365 interact with the VM 395 in order to access the hardware 370. In addition, the VM 395 may be responsible for starting and stopping VMs on the hypervisor 365. The VM 395 may perform other functions for managing and controlling the VMs running on the hypervisor 365. Some embodiments of the VM 395 may include several daemons (e.g., Linux daemons) for supporting the management and control of other VMs running on the hypervisor 365. Since the VM 395 of some embodiments is manages and controls other VMs running on the hypervisor 365, the VM 395 may be required to run on the hypervisor 365 before any other VM is run on the hypervisor 365.

As shown in FIG. 3, the VM 395 includes the kernel 355 and the userspace 350. In some embodiments, the kernel is the most basic component of an operating system that runs on a separate memory space and is responsible for managing system resources (e.g., communication between hardware and software resources). In contrast, the userspace is a memory space where all user mode applications may run.

As shown, the userspace 350 of the VM 395 includes the OVS daemon 340 and the OVS database server 345. Other applications (not shown) may be included in the userspace of the VM 395 as well. The OVS daemon 340 is an application that runs in the background of the userspace of the VM 395. The OVS daemon 340 of some embodiments receives switch configuration from the network controller 306 (in a network controller cluster) and the OVS database server 345. The management information includes bridge information, and the switch configuration includes various flows. These flows are stored in the flow table 315. Accordingly, the physical forwarding element 305 may be referred to as a managed forwarding element.

In some embodiments, the OVS daemon 340 communicates with the network controller using OpenFlow Protocol. In some embodiments, the OVS database server 345 communicates with the network controller 306 and the OVS daemon 440 through a database communication protocol (e.g., OVS database protocol). The database protocol of some embodiments is a JavaScript Object Notation (JSON) remote procedure call (RPC) based protocol.

The OVS database server 345 is also an application that runs in the background of the userspace of the VM 395. The OVS database server 345 of some embodiments communicates with the network controller 306 in order to configure the OVS forwarding element (e.g., the OVS daemon 340 and/or the OVS kernel module 320). For instance, the OVS database server 345 receives management information from the network controller 306 for configuring bridges, ingress ports, egress ports, QoS configurations for ports, etc., and stores the information in a set of databases.

As illustrated in FIG. 3, the kernel 355 includes the OVS kernel module 320. This module processes and routes network data (e.g., packets) between VMs running on the host 300 and network hosts external to the host (i.e., network data received through the NICs 385 and 390). For example, the OVS kernel module 320 of some embodiments routes packets between VMs running on the host 300 and network hosts external to the host 300 couple the OVS kernel module 320 through a bridge 308.

In some embodiments, the bridge 308 manages a set of rules (e.g., flow entries) that specify operations for processing and forwarding packets. The bridge 308 communicates with the OVS daemon 340 in order to process and forward packets that the bridge 308 receives. For instance, the bridge 308 receives commands, from the network controller 306 via the OVS daemon 345, related to processing and forwarding of packets.

In the example of FIG. 3, the bridge 308 includes a packet processor 330, a classifier 360, and an action processor 335. The packet processor 330 receives a packet and parses the packet to strip header values. The packet processor 330 can perform a number of different operations. For instance, in some embodiments, the packet processor 330 is a network stack that is associated with various network layers to differently process different types of data that it receives. Irrespective of all the different operations that it can perform, the packet processor 330 passes the header values to the classifier 360.

The classifier 360 accesses the datapath cache 325 to find matching flows for different packets. The datapath cache 325 contains any recently used flows. The flows may be fully specified, or may contain one or more match fields that are wildcarded. When the classifier 360 receives the header values, it tries to find a flow or rule installed in the datapath cache 325. If it does not find one, then the control is shifted to the OVS daemon 340.

In some embodiments, the set of upcall handlers 312 is responsible for handling such a case when there is no matching flow in the datapath cache 325. An upcall handler is referred to in some embodiments as open flow protocol datapath interface (ofproto-dif). The upcall handler of some embodiments is a child process of the OVS daemon 340 process. The set of upcall handlers 312 of some embodiments installs flows in the datapath cache 325 based on one or more flow entries from a set of one or more flow tables 315. Here, the set of flow tables 315 reside in userspace memory. When there is a miss in the cache 325, an upcall handler may be called to install a rule in the cache based on a flow entry from a flow table. For instance, in some embodiments, if there is a miss in the cache, a dispatcher (not shown) receives the flow miss, chooses an upcall handler, and hands the missed packet off to the handler for processing and installation. In this manner, the physical forwarding element 305 can quickly process each subsequent packet with the same set of header values using the rule in the cache 325. The datapath cache 325 provides a fast path to process incoming packets because it does not involve any translation at the userspace 350.

As shown in FIG. 3, the physical forwarding element 305 of some embodiments includes the set of revalidators 316. Each revalidator operates independently of each upcall handler and each other revalidator to validate one or more flows in the datapath cache 325. In some embodiments, the validation entails checking the flow in the datapath cache 325 against one or more flow entries in the set of flow tables. For instance, a revalidator may compare a set of match fields of a flow in the datapath cache against a set of match fields of a flow entry in the flow table. The revalidator compares the sets of match fields to determine if they match one another. If the sets match one another, the revalidator validates the flow in the datapath cache by determining whether the flow in the datapath cache and the flow entry in the flow table are associated with the same result, meaning the same set of actions. If the results are the same, the revalidator of some embodiments retains the flow in the datapath cache. If the results are not the same, the revalidator of some embodiments deletes the flow from the datapath cache 325 or updates the set of actions associated with the flow.

In conjunction with the validation or instead of it, the revalidator of some embodiments performs one or more other operations when iterating through the flows. The operations include a flow eviction process to remove flow from the datapath cache 325. The flow eviction process of some embodiments determines if a flow in the datapath has expired and, if so, removes the flow from the datapath cache. For instance, if the flow has not been used for a set period of time, the revalidator may delete the flow from the datapath cache. This feature prevents the datapath cache from being filled with potentially many flows that has not been used for some time.

In some embodiments, the physical forwarding element 305 performs a set of statistics related operations on a flow. The revalidator may examine a packet counter and/or a byte counter associated with the flow. In addition, the revalidator may update the packet counter and/or the byte counter. For instance, the revalidator may increment one or both the packet counter and the byte counter.

In the example of FIG. 3, the physical forwarding element 305 includes the flow dumper 314. This component 314 runs independently of each upcall handler and each revalidator in the set of revalidators 316. In some embodiments, the flow dumper's main function is to iterate through each flow in the datapath cache 325 and assign the flow to an available revalidator. The flow dumper 314 of some embodiments facilitates multi-threaded operations by assigning different flows from the datapath cache to different revalidators. For instance, the flow dumper 314 might assign a first flow from the datapath cache 325 to a first revalidator and assign a second flow to a second revalidator. In different threads, the first and second revalidators might execute on the physical forwarding element 200 at least partially at the same time.

In the example described above, the physical forwarding element separates the task of installing flows in the cache from other tasks, such as the task of evicting flows from the cache, task of updating statistics relating to the flows, and the task of validating the flows. These tasks can take some time (e.g., some milliseconds) to process for each flow in the cache. During that time, the physical forwarding element may not be able to handle flow misses in the cache. In a previous solution, the physical forwarding element utilized a single thread to perform these various tasks, as well as the task of installing flows in the cache. Different from the previous solution, the physical forwarding of some embodiments can optimally process packets as it utilizes multiple threads to handle the installation and the management of flows in the cache.

One of ordinary skill in the art would understand that the architecture is an example architecture and that different embodiments can include different sets of components or modules. The naming of the various components is arbitrary and can change from one implementation to another. Also, the architecture shows two different layers (e.g., the kernel layer and the userspace layer) performing various operations. In some embodiments, these operations occur at just one layer (e.g., at the userspace layer) or are further split into other layers.

II. Upcall Handler Examples

Figure 4:
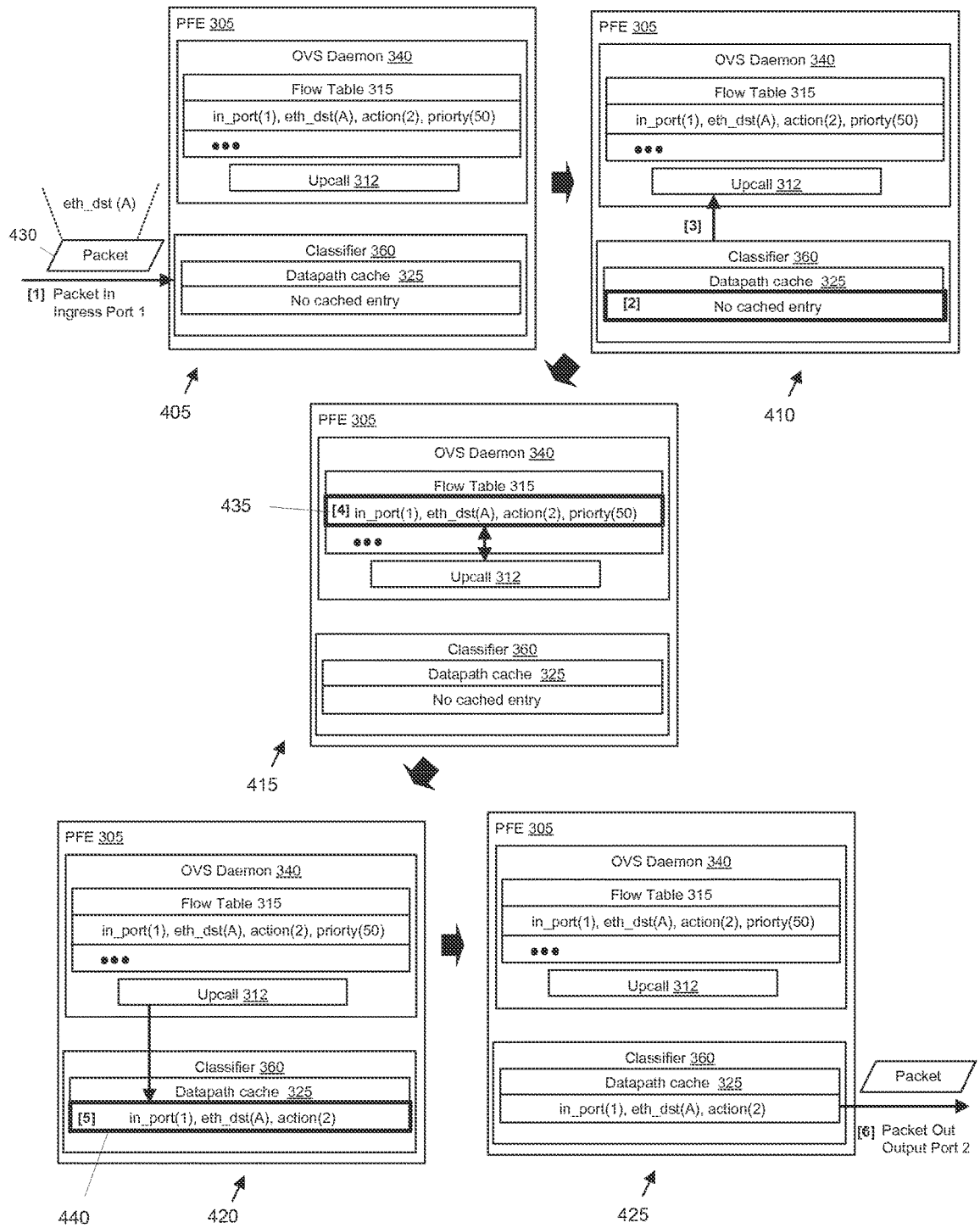
FIG. 4 provides an illustrative example of how the physical forwarding element of some embodiments installs flows in a flow table cache.

In some embodiments, the physical forwarding element includes a set of one or more upcall handlers for handling flow misses in the datapath cache. An upcall handler of some embodiments installs flows in the datapath cache based on one or more flow entries from a set of one or more flow tables. FIG. 4 provides an illustrative example of how the physical forwarding element 305 of some embodiments installs flows in the datapath cache 325. Five operational stages 405-425 of the physical forwarding element 305 are shown in the figure. The physical forwarding element 305 is the same as the one described above by reference to FIG. 3. To simply the description, only one upcall handler is shown in the figure. However, the physical forwarding element might employ multiple upcall handlers to handle misses in the cache. For instance, if there is a miss in the cache, a dispatcher receives the flow miss, chooses an upcall handler, and hands it off to the handler for processing and installation.

In the first stage 405, the physical forwarding element 305 receives a packet 430. The second stage 410 shows that the classifier 360 performs a look-up operation to find a matching flow that is stored in the datapath cache 325. The datapath cache 325 provides a fast path to process incoming packets because it does not involve any translation by the OVS daemon 340. In the second stage 410, there are no flow entries stored in the datapath cache 325. Accordingly, the packet processing is transferred to the OVS daemon 340. In some embodiments, the transferring entails sending the packet 430 to the upcall handler 312.

The third stage 415 illustrates the OVS daemon 340 dynamically generating a flow entry to store in the datapath cache 325. Specifically, the upcall handler 312 of some embodiment utilizes a classification algorithm to find one or more matching flows from one or more flow tables. For example, some embodiments optimize the matching process through a series of hash table look-ups based on a set of header values associated with the packet 430. The physical forwarding element of some embodiments can utilize one of a number of different classification algorithms when looking for one or more matching flows.

In some embodiments, the physical forwarding element uses a tuple search algorithm to find a matching flow. The tuple space search algorithm is a hashed-based search algorithm. It is similar to the linearly stepping through each flow in a flow table (e.g., starting with the flow with the highest priority value). However, instead of linearly traversing through every rule, the tuple space algorithm linearly traverses through different groups of rules that are organized by match fields. In some cases, the tuple space search can be much faster than a "linear search" because it can perform a lookup within a group of rules that have the same or similar pattern using a hash table.

An example of a tuple space search will now be described. Suppose that a physical forwarding element maintains a flow table with the following three rules:

priority 5, in_port=1, eth$_{13}$ src=2→Action 1;
priority 4, in_port=2, eth_src=3→Action 2; and
priority 3, in_port=5→Action 3.

In some embodiments, at flow table creation time, the physical forwarding element organizes these rules into different groups based on what fields (or partial fields) the rules match on. In this case, there are two groups:

group 1 (in_port, eth_src); and
group 2 (in_port).

Here, each rule is placed in a hash table that belongs to a particular group (e.g., group 1 or group 2). The hash table can have very fast (e.g., nearly instant) lookup. Thus, instead of a linearly traversing through all of the rules, the physical forwarding element can traverse through each hash table, doing a hash table lookup on each one. In some embodiments, each hash table carries with it the priority of the highest priority rule it contains. Hence, if there is a match in the first hash table, the physical forwarding element is programmed to know that the rule has a higher priority value than every other rule in a subsequent table. The physical forwarding element can therefore skip the lookup in the subsequent hash table.

In some embodiments, the physical forwarding element uses a staged lookup algorithm to search for one or more matching flows. The staged lookup algorithm is similar to the tuple space algorithm; however, it takes into account the fact that some header fields may change more frequently than others. Based on this fact, it performs a multi-staged search starting with infrequently changing fields, and progressing to frequently changing ones.

In utilizing this algorithm, the physical forwarding element of some embodiments does not look at all the fields (e.g., in a hash table) at once but first looks at those fields that do not change frequently. If none of those fields matches, the physical forwarding element terminates the lookup operation without having to lookup fields that change frequently. For instance, suppose that there is a particular hash table, which looks at the fields, in_port, eth_src, ip_src, and tcp_src.

With standard tuple space search, the software physical forwarding element looks at all those fields irrespective of whether the fields changes frequently or infrequently. With the staged lookup algorithm, the lookup is broken into different stages. For instance, in the first stage, the algorithm can look up the in_port in a hash table and get a simple "yes" or "no" as to whether there is a match on the in_port. If the answers "no", the algorithm can terminate knowing that no further stages match. If the answer is "yes", the algorithm can proceed to the next stage, which looks up the in_port and eth_src in a separate hash table. If successful, the algorithm may move onto in_port, eth_src, and ip_src. Thereafter, if successful again, the algorithm may look up the full in_port, eth_src, ip_src, and tp_src. One of the main ideas here is that, at each stage, if there is a miss, the algorithm can terminate without looking at the higher layer headers. This is important because the higher layer headers are the ones that are most likely to change from packet to packet and therefore the most problematic when trying to improve performance.

In some embodiments, the physical forwarding element uses a decision tree algorithm to perform the classification operations, or some variation of the decision tree algorithm. In some embodiments, the decision tree algorithm entails performing several phases of operations. For example, in the first phase, some fields of the packet header are split up into multiple chunks that are used to index into multiple memories in parallel. Each of the parallel lookups yields an output value. The contents of each memory are chosen so that the result of the lookup is narrower than the index. In subsequent phases, the index into each memory is formed by combining the results of the lookups from earlier phases. In the final phase, there is one result left from the lookup. This is because of the way the memory contents have been pre-computed. The decision tree algorithm is also described in the document entitled "Packet Classification on Multiple Fields" by Pankaj Gupta and Nick McKeown. The document was published in October of 1999 and is incorporated herein by reference.

Referring to the third stage 415 of FIG. 4, the upcall handler 312 has been invoked to handle the miss in the datapath cache 325. Here, the upcall handler 312 performs a look-up operation on the flow table to find a flow entry that matches the packet. In making this determination, the upcall handler 312 has compared the ingress port of a flow entry 435 with the ingress port at which the packet 430 was received. The upcall handler 312 has also compared the destination Ethernet addresses match field against the corresponding header field. Here, as the header and match field values match one another, the upcall handler 312 has found a matching flow in the flow 435. This third stage 415 shows a simplified scenario. In many cases, the upcall handler may look at multiple flows to find a matching flow.

In addition, even if a matching flow is found, the flow's action may specify a resubmit operation. That is, a packet can go through the daemon's classification algorithm multiple times to find several matching flows from one or more flow table. When multiple matching flows are found, the upcall handler 312 of some embodiments generates one consolidated flow entry to store in the datapath cache 325. An example of a resubmit operation is described below by reference to FIG. 12. However, in the example of FIG. 12, the matching flow is found from a flow table by matching a set of match fields associated with a flow in the cache. Whereas, in the example of FIG. 4, the matching flow is found from a flow table by matching a set of header fields associated with a packet.

In some embodiments, the upcall handler operates in conjunction with a number of different components to generate a flow to push down to the datapath cache. For instance, the upcall handler may utilize a bonding module when there is more than one interfaces associate with a port. The upcall handler may utilize a Media Access Control (MAC) address learning module. The MAC learning module of some embodiments identifies, for a given packet, one or more ports to output the packet based on the packet's header field values (e.g., the destination Ethernet field value).

The upcall handler may utilize a Bidirectional Forwarding Detection (BFD) module is used to detect whether a packet is a BFD packet. For example, if a packet comes in, the BFD module may be called to determine whether the packet is a BFD packet or not. If the packet is a BFD, the BFD module may consume the packet and generation of the cache flow will terminate at that point. The upcall handler of some embodiments calls a learn action module. The learn action module installs a rule, which can affect traffic. The learn action module can be used to more abstractly learn MAC addresses. For example, if a packet with a particular Ethernet source address comes in through port 1, the learn action module can be used to install a rule that specifies that any packet whose destination MAC address field has the same address should be output to port 1.

As shown in FIG. 4, in the third stage 415, the upcall handler 312 generates a cache entry based on the matching flow 435. The fourth stage 420 illustrates that the flow entry 440 has been pushed down and stored in the datapath cache 325. The cached entry 440 includes an ingress port value, Ethernet destination address value, and an action value. However, different form the flow entry 435, the cached entry 440 does not include a priority value. This is because the datapath cache 325 of some embodiments does not store multiple flows that can match a same packet. In other words, the datapath cache stores only one flow that can match a given packet, instead of multiple entries. Alternatively, in some embodiments, the datapath cache 325 stores multiple flows that can match a given packet. Also, each flow entry may be associated with a priority value. In addition, the classifier 360 may perform one or more resubmit operations to find any other matching flows from the datapath cache 325.

Lastly, the fifth stage 425 illustrates the physical forwarding element 305 processing the packet 430. The cache entry 440 specifies that any packet that is received at ingress port one and has an Ethernet destination address "A" should be output to port two. Following this rule, the physical forwarding element 305 outputs the packet 430 through port two.

III. Cache Size Adjustment Examples

In some embodiments, the physical forwarding element dynamically adjusts the number of flows allowed in a flow table cache. In adjusting, the physical forwarding element initially sets the maximum number of flows allowed in the cache. From the flow table cache, the physical forwarding then (1) iterates through the set maximum number of flows and (2) records the length of time (i.e., the duration) it took to iterate through the flows. Based on the duration, the physical forwarding element then automatically adjusts the size of the flow table cache by increasing or decreasing the number of flows allowed in the cache. Alternatively, the physical forwarding element may choose to keep the cache size the same based on the duration.

Figure 5:
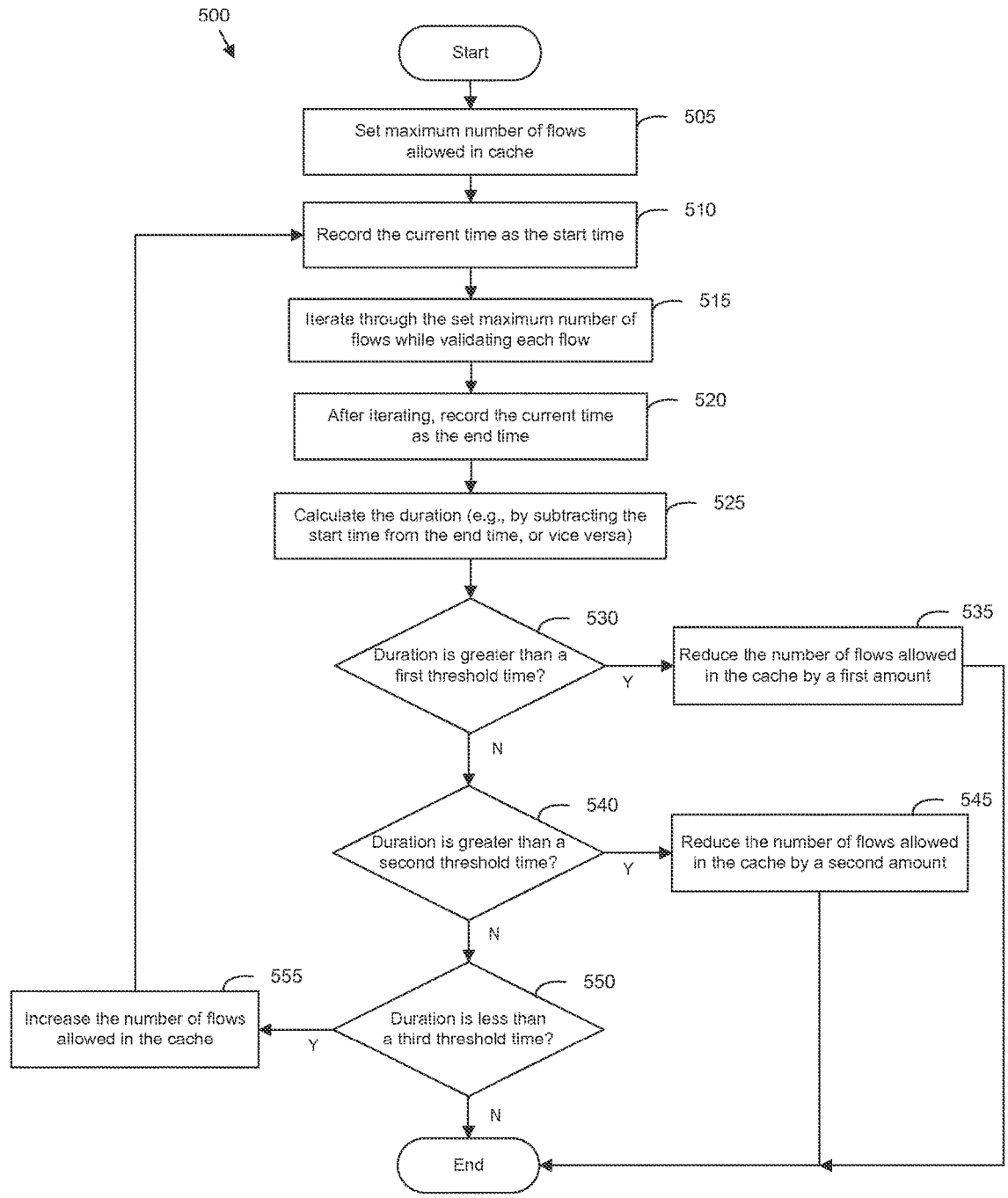
FIG. 5 conceptually illustrates a process that some embodiments use to dynamically adjust the size of a flow table cache.

FIG. 5 conceptually illustrates a process 500 that some embodiments use to dynamically adjust the size of a flow table cache. In some embodiments, the process 500 is performed by the physical forwarding element. The process 500 is an example variation on the process 100 that was described above by reference to FIG. 1. The process 500 will be described by reference to FIGS. 6 and 7. These figures show several examples of automatically adjusting the size of the cache.

As shown in FIG. 5, the process 500 begins by initially setting (at 505) the cache size. Here, the process 500 might choose some number as the maximum number of flows that are allowed in the cache. For instance, the process might start by choosing an arbitrary low number (e.g., 5000 or some other number) as the size of the datapath cache.

At 510, the process 500 records the current time as the start time. The process 500 then iterates (at 515) through the set maximum number of flows. In iterating through the flows, the process 500 of some embodiments performs one or more of the following operations: validating the flow, performing statistics related operations (e.g., examining and updating packet and byte counters that are associated with the flow), and handling flow expiration.

After iterating, the process 500 records (at 520) the current time as the end time. The process 500 then calculates the duration it took to iterate through the set number of flows. For example, to calculate the duration, the process 500 might subtract the start time from end time, or vice versa. Alternatively, the process 500 of some embodiments starts a timer at the start of the iteration and stops the timer at end of the iteration. The duration will then be the time that was recorded at the end of the iteration.

Figure 6:
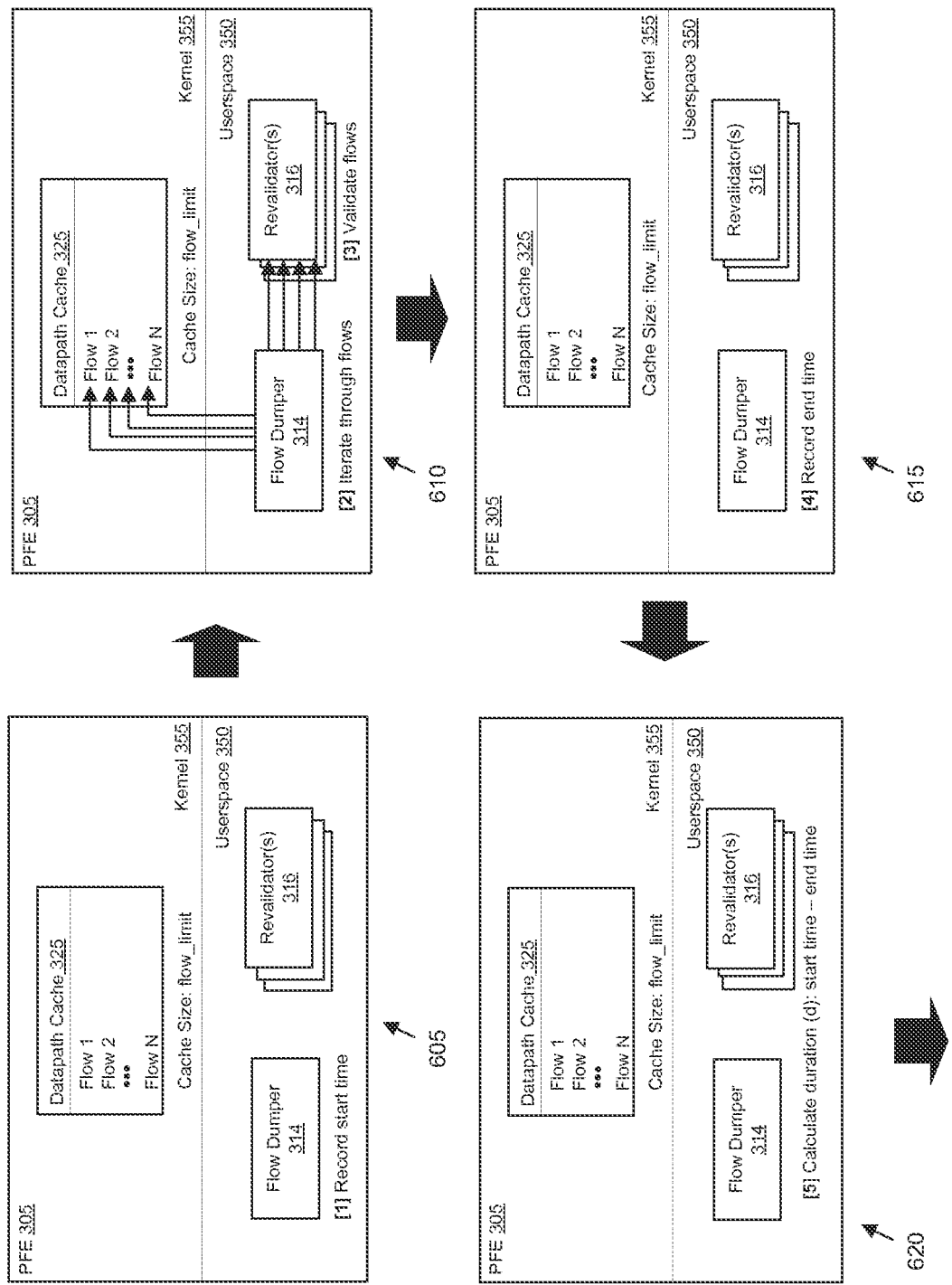
FIG. 6 shows an example of the physical forwarding element determining the length of time it took to iterate through the flows in the flow table cache.

FIG. 6 shows an example of the physical forwarding element 305 calculating the duration it took to iterate through the flows in the flow table cache. Four operational stages 605-620 of the physical forwarding element 305 are shown in this figure. The physical forwarding element 305 is the same as the one described above by reference to FIG. 3.

The first stage 605 illustrates the physical forwarding element 305 prior to iterating through the flows in the datapath cache 325. The datapath cache 325 is associated with a cache size that identifies the maximum number of the flows allowed in the cache. In this example, the cache size is referred to by a variable name "flow limit". Also, in this example, the flow dumper 314 is responsible for keeping track of the time it takes to iterate through a set number of flows. However, the physical forwarding element 305 of some embodiments can employ a different component to keep track of the duration.

In the first stage 605, the flow dumper 314 records the current time as the start time. The second stage 610 shows the physical forwarding element 305 iterating through the flows in the datapath cache 325. In particular, the flow dumper 314 iteratively selects each flow (e.g., starting with the first flow) and assigns the flow to one particular revalidator. The revalidator then performs a set of operations on the flow. This can entail validating the flow, checking the expiration of the flow, and/or performing statistics related operations.

The third stage 615 shows the physical forwarding element 305 after iterating through the set number of flows in the datapath cache 325. Specifically, upon completion, the flow dumper 314 records the current time as the end time. This third stage 615 is followed by the fourth stage 620, which shows the physical forwarding element 305 calculating the duration by subtracting the end time from the start time.

Referring to FIG. 5, the process 500 determines (at 530) whether the duration is greater than a first threshold time. If so, the process 500 adjusts (at 535) the cache size by reducing the number of flows allowed in the cache by a first amount. The process 500 then ends. Otherwise, the process 500 determines (at 540) whether the duration is greater than a second threshold time. If so, the process 500 adjusts (at 545) the cache size by reducing the number of flows allowed in the cache by a second amount. The process 500 then ends. Otherwise, the process 500 proceeds to 550, which is described below.

At 550, the process 500 determines whether the duration is greater than a third threshold time. If so, the process 500 adjusts (at 555) the cache size by increasing the number of flows allowed in the cache. The process 500 then ends. In some embodiments, the process uses an additive-increase/multiplicative-decrease (AIMD) algorithm to dynamically adjust the cache size. For instance, if the duration the duration was some milliseconds (e.g., 500 ms), the process might perform an additive increase operation that bumps the flow limit from one number (e.g., 50000) to another number (e.g., 6000). On the other hand, if it took a significant amount of time to loop through the flows, the process might perform multiplicative decrease operation that reduces the number of flows by some factor (e.g., ½, ⅓, ¼ or some other factor).

Figure 7:
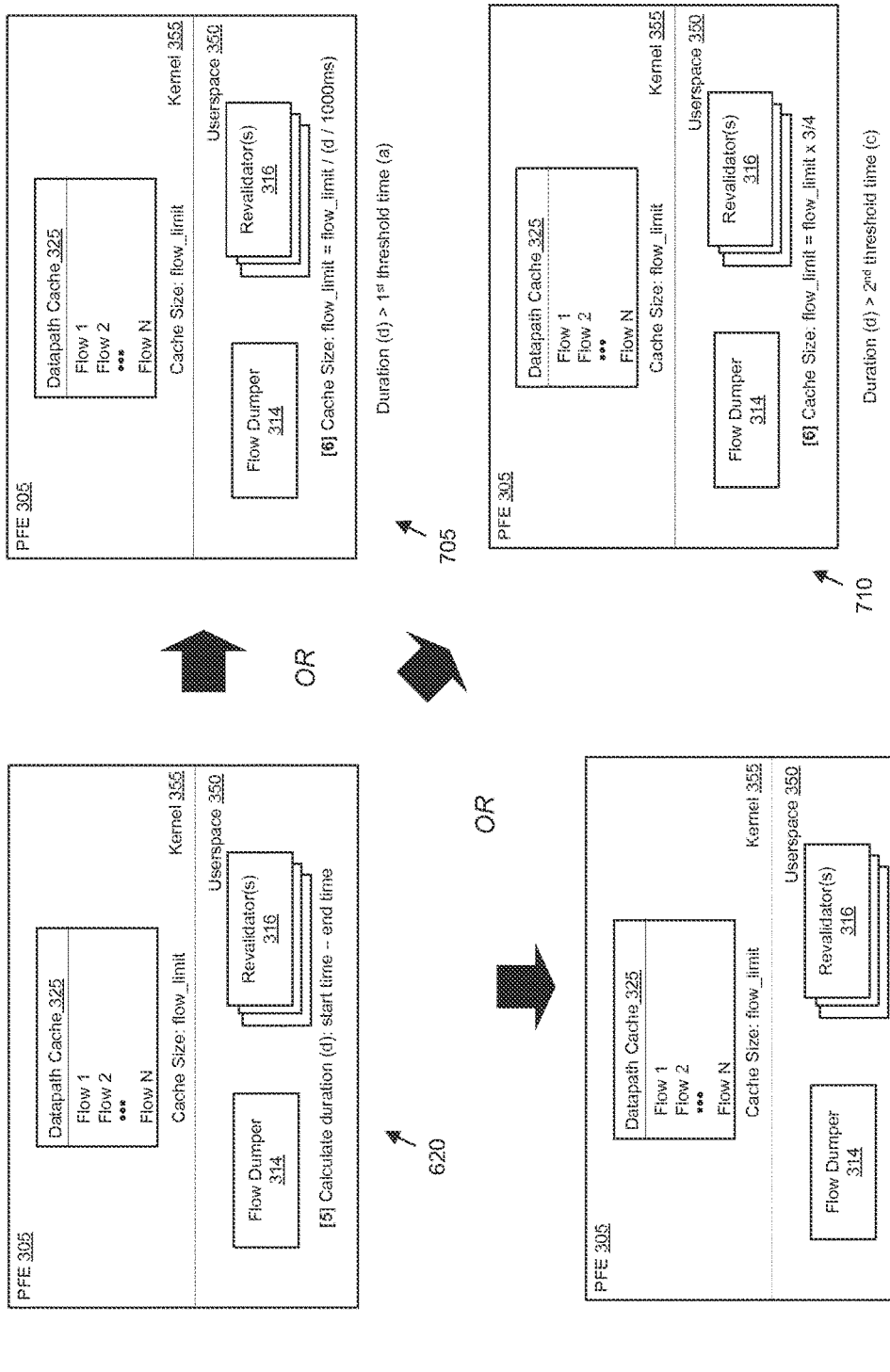
FIG. 7 shows an example of the physical forwarding element adjusting the size of the flow table cache base on the length of time.

FIG. 7 shows the physical forwarding element increasing or decreasing the size of the cache based on the duration. This figure is a continuation of the operations shown in FIG. 6. Specifically, FIG. 7 shows the final stage 620 of FIG. 6, and three possible stages (705, 710, or 715) depending on whether the duration is greater than a first threshold time, the duration is greater than a second threshold time, or the duration is less than a third threshold time. These possible stages represent the three branches of operations shown in the process 500 of FIG. 5.

As shown in FIG. 7, the stage 620 shows the physical forwarding element 305 calculating the duration by subtracting the end time from the start time. For the purpose of this document, all times are shown in milliseconds unless otherwise stated. In the example of stage 6620, if the duration is greater than a first threshold time, the physical forwarding element 305 transitions to stage 705. Here, as the duration is considered to be high, the physical forwarding element 305 uses the following first formula to reduce the number of flows in the cache:

flow limit=flow limit/(duration ms/1000 ms).

As an example, if the duration is greater than 2000 ms, the physical forwarding element may determine that the duration is high and use the formula to set a new flow limit. The equation above divides the flow limit by the number of seconds the duration is. Thus, if the duration was 3 seconds, the physical forwarding element divides the flow limit by 3. If the duration was 4 second, the flow limit would be divided by 4, and so forth. This has the advantage of reducing the flow limit more aggressively or less aggressively in accord with the duration. That is, the longer the duration the more aggressively the formula is in reducing the number of flows. Conversely, the shorter the duration the less aggressively the formula is in reducing the number of flows.

If the duration is greater than a second threshold time, the physical forwarding element 305 of some embodiments transitions to stage 710. The second threshold time is less than the first threshold time. In this stage 710, the physical forwarding element 305 still reduces the number of flows but less aggressively than stage 705. Particularly, the physical forwarding element 305 reduces the number of flows by some percentage (e.g., using the multiplicative-decrease function). For instance, if the duration is greater than some time (e.g., 1300 ms), the physical forwarding element 305 uses the following formula to reduce the number of flows:

flow limit=flow limit*¾ or*some other fraction.

In the example of FIG. 7, if the duration is greater than a third threshold time, the physical forwarding element 305 transitions to stage 715. The third threshold time is less than the first threshold time and the second threshold time. At this stage 715, if the duration is less than the third threshold time (e.g., 1000 ms), the physical forwarding element 305 may increase the number of flows by some value (e.g., 1000). In some embodiments, the physical forwarding element also takes into account the number of flows that it has processed. For instance, if the physical forwarding element has processed at least some number of flow (e.g., 200 flows), then it has some indication of the estimated time required to process one or more flows.

Alternatively, or conjunctively with the number of flows, the physical forwarding element of some embodiments takes into account the rate at which it processed flows in the last iteration. If at that rate, the physical forwarding element can handle the flow limit number of flows within a particular time (e.g., one second), then the flow limit may be increased. An example code that takes into account (1) the third threshold time, (2) the number of flows processed, and (3) the rate at which it process flows in the last iteration is shown as follows:

if (duration ms<1000 ms&&number of
        flows>2000&&flow limit<number of
        flows*1000 ms/duration ms){flow limit=flow
        limit+1000;}.

In the above equation, the first condition (i.e., duration ms<1000 ms) specifies only increasing the number of flows where the flow processing was quick or snappy. The second condition (i.e., number of flows>2000) specifies that the physical forwarding element only increase the number when a given number of flows have been processed so that it has a reliable estimate of the time it takes to process one or more flows and make a decision on whether to increase the number of flow. The third condition (i.e., flow limit<number of flows*1000 ms/duration) specifies the rate at which flows were processed in the last iteration. For instance, if the rate at that rate, the physical forwarding element could handle the flow limit number of flows within one second, then the physical forwarding element of some embodiment increases the number flow by some number (e.g., bumps up the limit by 1000 flow). This addition is the additive-increase portion of the AIMD algorithm. In some embodiments, if each one of those three cases above is not met, the physical forwarding element does nothing, which means it retains the current flow limit. Alternatively, the physical forwarding element might consider one or two of those variables when making a decision to increase the flow limit. In some embodiments, the physical forwarding element automatically increases or decreases the number of additional flows allowed in the cache based on the duration. For example, if the duration was short, then the physical forwarding element might bump increase the flow limit by some number. If the duration was longer, then the physical forwarding element might increase the flow limit even more, and so forth.

In addition to automatic adjustment, the physical forwarding element of some embodiments allows end-users to manually configure the flow limit. In some embodiments, the physical forwarding element is set with a default floor value (e.g., 2000 flow) for the flow limit. This value can be changed manually by an end-user, in some embodiments. The physical forwarding element of some embodiments allows a user configurable maximum number of flow, (e.g., which default to some value, such as 200,000).

As mentioned above, in a previous solution, the physical forwarding element is associated with an arbitrarily number as the flow eviction threshold. If the number of flows in the cache reaches this limit, then unused flows would be removed from the cache. The flow eviction threshold presents a tradeoff between the expense of maintaining large numbers of flows in the cache, and the benefit of avoiding unnecessary flow misses. By dynamically adjusting the threshold limit, each physical forwarding element can have a different flow limit that is optimal for that physical forwarding element. For instance, with the dynamic adjustment, the cache size depends at least partially on the specifications of the physical forwarding element, such as the amount of memory the device has, the speed of the its central processing unit (CPU), the number of cores that the CPU has, etc.

III. Revalidator Examples

The physical forwarding element of some embodiments uses a set of one or more revalidators to validate flows in a datapath cache. Each revalidator operates independently of each upcall handler and each other revalidator to validate one or more flows in the datapath cache. Several examples of validating flows will now be described by reference to FIGS. 8-11.

Figure 8:
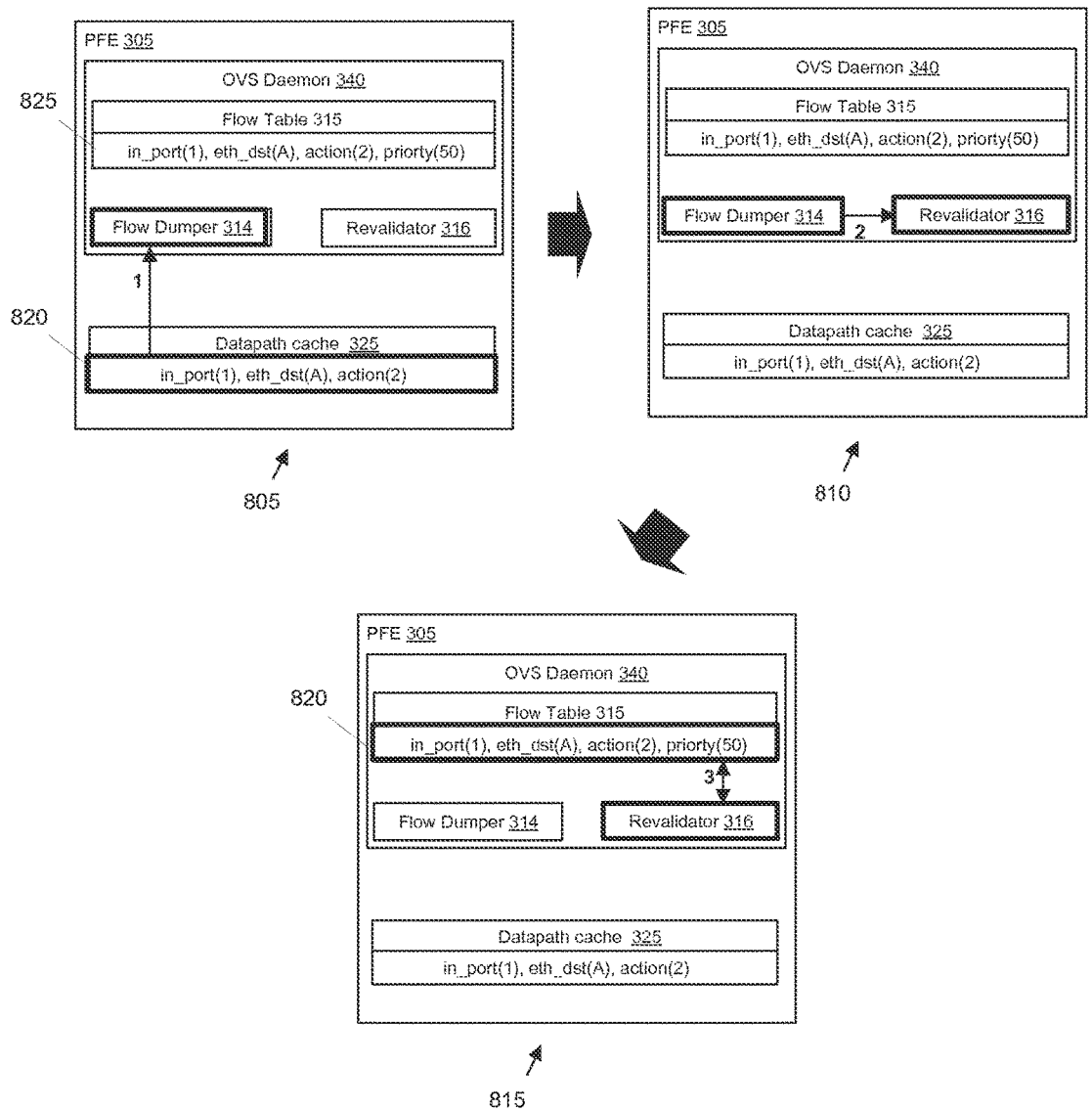
FIG. 8 illustrates an example of the physical forwarding element validating a flow in a flow table cache.

FIG. 8 illustrates an example of the physical forwarding element 305 validating a flow 820 in the datapath cache 325. Three operational stages 805-815 of the physical forwarding element 305 are shown in this figure. The physical forwarding element is the same as the described above by reference to FIG. 3.

The first stage 805 shows the physical forwarding element 305 with a flow 820 in the datapath cache 325. The physical forwarding element's set of upcall handlers (not shown) might have previously installed the flow 820 in the cache 325. The flow 820 specifies outputting any packet received through ingress port one and having a destination Ethernet address of 'A' to output port two. In the first stage 805, the flow dumper begins iterating through each flow in the datapath cache. In some embodiments, the flow dumper begins the iteration upon a flow being installed in the cache or when triggered (e.g., when a set number of flows are installed in the cache).

In the first stage 805, the flow dumper 314 retrieves the flow 820 from datapath cache 325. The second stage 810 shows that the flow dumper 314 selecting a revalidator 316 to validate the flow 820. As mentioned above, for a next different flow, the flow dumper 314 might select the same revalidator 316 or another revalidator (not shown) to validate that next flow.

The third stage 815 shows the revalidator 316 validating the flow 820 in the datapath cache 325. The revalidator 316 of some embodiments operates in its own thread to validate the flow. In this example, the revalidator 316 validates the flow 820 against a flow entry 825 in a flow table 315. To simplify the description, only one flow entry 825 is shown in the flow table 315. However, the flow table 315 can include many more flow entries. The physical forwarding element of some embodiments can support multiple tables, each with its own set of flows. The flow entry 825 from the flow table 315 specifies outputting any packet received through ingress port one and having a destination Ethernet address of 'A' to output port two. The flow entry is also associated with a priority value.

In some embodiments, the validation entails comparing a flow in a datapath cache 325 against one or more flow entries in a set of one or more flow table. For instance, the revalidator 316 may compare a set of match fields of the flow 820 in the datapath cache 325 against the set of match fields of the flow entry 825 in the flow table 315. The revalidator 316 compares the sets of match fields to determine if they match one another. If the sets match one another, the revalidator 316 validates the flow 820 in the datapath cache 325 by determining whether the flow in the datapath cache and the flow entry in the flow table are associated with the same result, meaning the same set of actions. If the results are the same, the revalidator 316 of some embodiments retains the flow 820 in the datapath cache 325. If the results are not the same, the revalidator 316 of some embodiments deletes the flow 820 from the datapath cache 325 or updates the set of actions associated with the flow.

In the example of the third stage 815, the set of match fields of the flow 820 in the datapath cache 325 matches the set of match fields of the flow 825 in the flow table 315. The actions associated with the two flows 825 and 820 are also the same. As such, the revalidator 316 has determined that the flow 820 in the datapath cache 325 is still valid. Accordingly, the revalidator 316 does not delete the flow 825 from the datapath cache 325.

In some embodiments, the physical forwarding element 305 iterates through each flow in the datapath cache periodically and/or when triggered. In some embodiments, the forwarding element is configured with a rule that specifies validating each flow in the datapath cache every set period of time (e.g., every one second at minimum). If the revalidation is completed within the set time period, a revalidator may not be called upon to validate another flow until the set time has passed. For example, if the revalidation has taken only some amount of time (e.g., 200 milliseconds) less that the allotted time, the rule might specify sleeping for the remaining amount of time (e.g., 800 milliseconds). This ensures that the same flow is not repeatedly checked many times when there are only a few flows in the datapath cache.

Alternatively, or conjunctively, the physical forwarding element can be triggered to perform the revalidation. In some embodiments, the forwarding element's main thread or daemon process can provide an indication that a change has occurred (e.g., a flow has been added to the datapath cache). In such cases, the physical forwarding element will then be trigged to perform the validation. The physical forwarding of some embodiments maintains a sequence number sequence number and every time an event that requires validation occurs, the main thread increments that sequence number. The revalidator threads may sleep until the sequence number has change and/or until the set time period has passed. In some embodiment, if either of those conditions is met, one or more of the revalidators performs the revalidation and then goes to sleep again.

Figure 9:
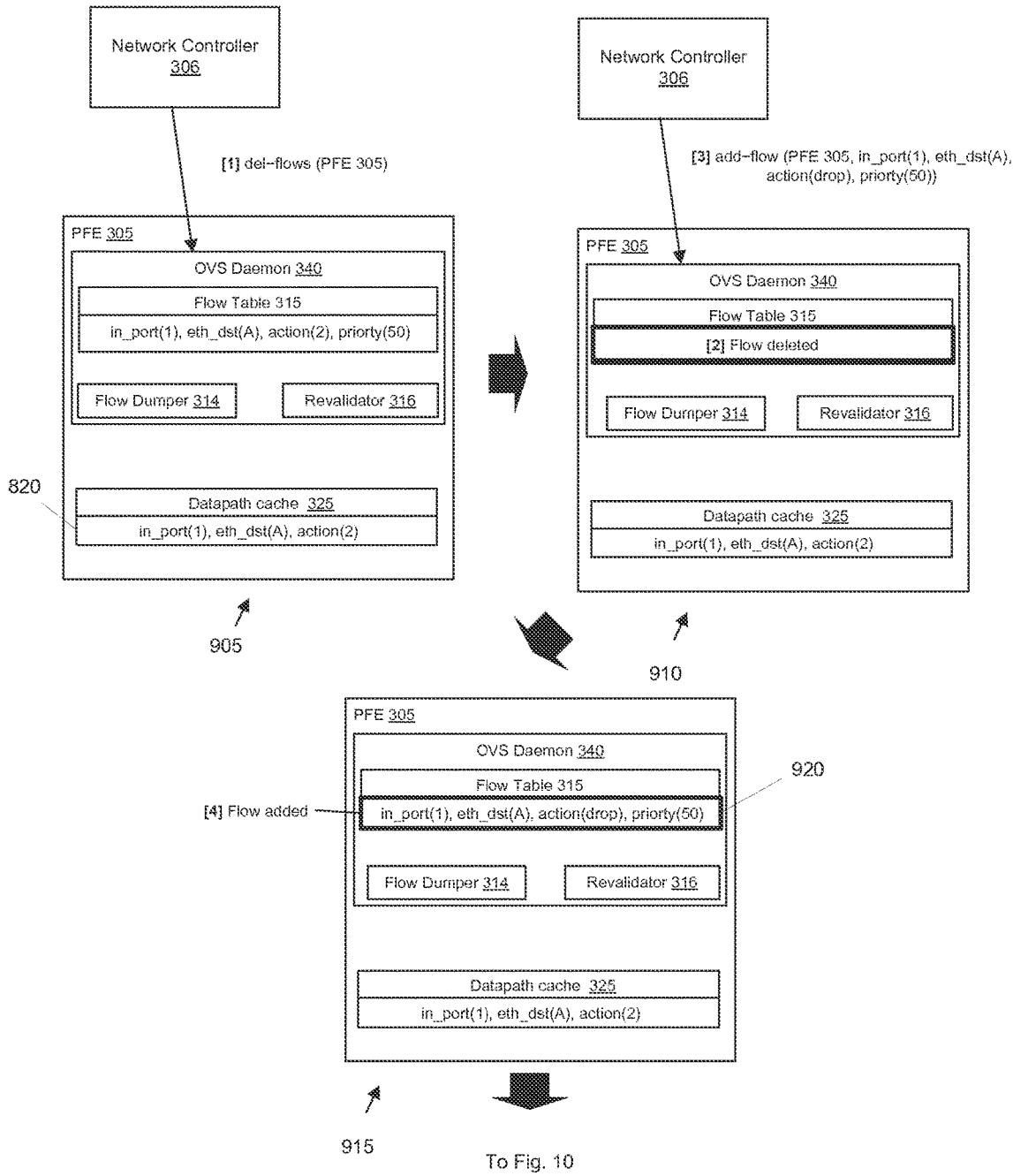
FIG. 9 shows a network controller updating a flow table that is maintained by the physical forwarding element.
Figure 10:
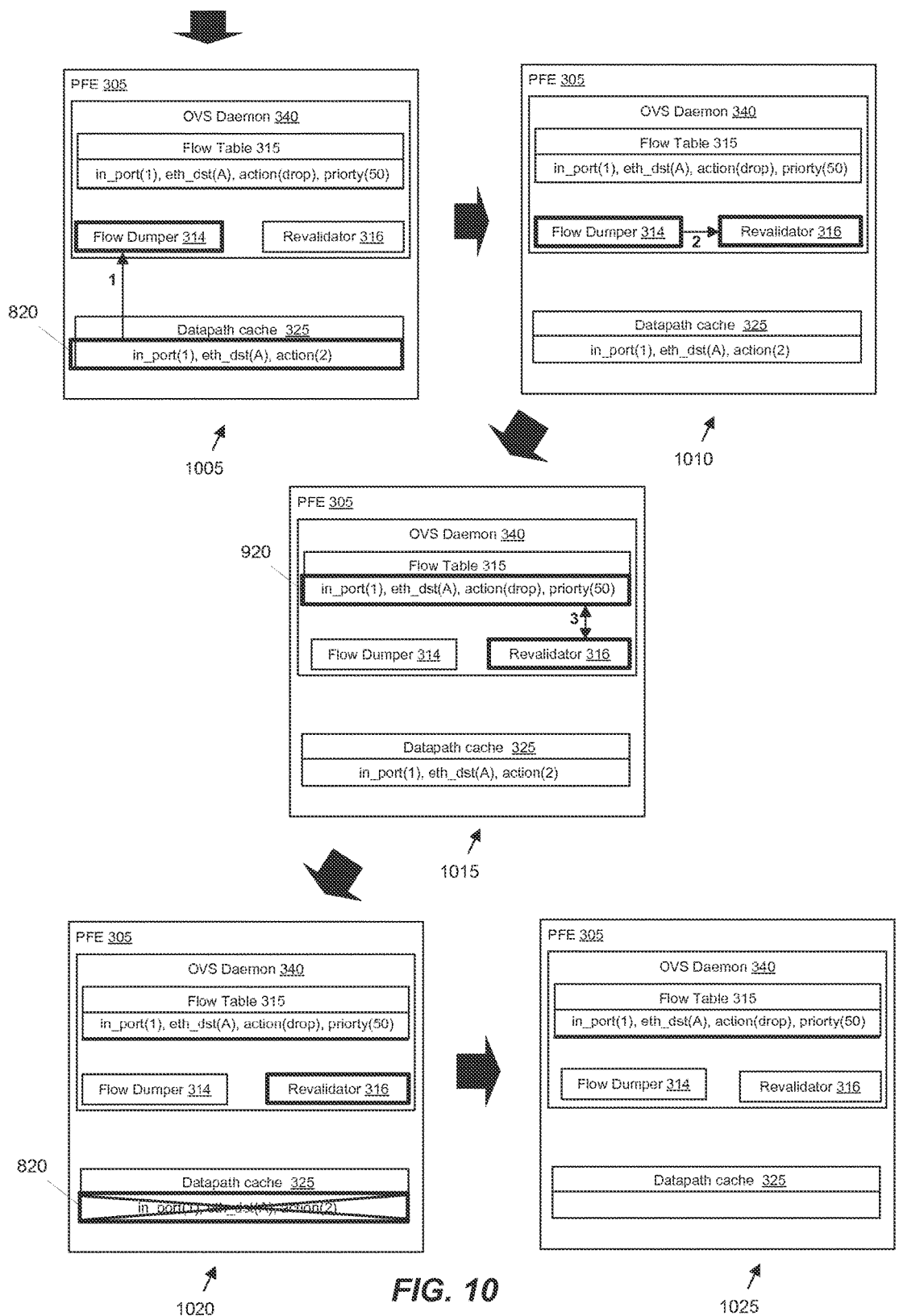
FIG. 10 illustrates an example of finding a flow in a cache to be invalid based on the update from the network controller.

In the example described above, the physical forwarding element 305 determines that a flow in the datapath cache remains valid. FIGS. 9 and 10 provide an illustrative example the physical forwarding element 305 determining that a flow is invalid and deleting the flow from the datapath cache 325. Specifically, FIG. 9 shows a network controller 306 updating a flow table 315 of the physical forwarding element 305. This update causes the flow in the datapath cache 325 to be invalid. This is followed by FIG. 10, which shows the physical forwarding element 305 determining that the flow is invalid and deleting the flow from the datapath cache 325.

FIG. 9 shows three operational stages 905-915 of the physical forwarding element 305. The first stage 905 shows the network controller 306 sending a command to the physical forwarding element 305. The command instructs the physical forwarding element 305 to delete all flows from the flow table 315. In this example, only one network controller 306 is shown. However, there can be a cluster of network controllers sending configuration and management commands to the physical forwarding element.

In the first stage 905, the OVS daemon 340 of the physical forwarding element 305 receives the command and deletes each flow from the flow table 315. The results of the command are shown in the second stage 910 because there are no flows in the flow table 315.

The second stage 910 also shows the network controller 306 sending another command to the physical forwarding element 305. The command instructs the physical forwarding element 305 to add a flow to the flow table 315. Accordingly, in the third stage, the OVS daemon 340 adds the flow 920 to the flow table 315. The flow 920 specifies dropping any packet received through ingress port one and having a destination Ethernet address of 'A'. Note that the set of match fields associated with the flow 920 in the flow table 315 is the same as the set of match fields associated with the flow 820 in the datapath cache 325. However, the actions of two flows 820 and 920 are different.

FIG. 10 shows five operational stages 1005-1025 of the physical forwarding element. These stages are a continuation of the ones shown in the previous figure. In the first stage 1005, the flow dumper 314 retrieves the flow 820 from datapath cache 325. The second stage 1010 shows that the flow dumper 314 selecting the revalidator 316 to validate the flow 820.

The third stage 1015 shows the revalidator 316 validating the flow 820 in the datapath cache 325. In the example of the third stage 1015, the set of match fields of the flow 820 in the datapath cache 325 matches the set of match fields of the flow 920 in the flow table 315. However, the actions associated with the two flows 820 and 920 is different. Therefore, the revalidator 316 has determined that the flow 820 in the datapath cache 325 is invalid. Accordingly, in the fourth stage 1020, the revalidator 316 deletes the flow 820 from the datapath cache 325. The fifth stage 1025 shows the physical forwarding element 305 after deleting the flow 820 from the datapath cache 325.

As mentioned above, instead of removing the flow 820 from the datapath cache 325, the revalidator 316 of some embodiments updates the flow. For instance, in the fourth stage 1020, the revalidator 316 can update the action associated with the flow 820 from outputting a packet to port two to dropping the packet. This update would then result in the flow 820 having the same action as the flow entry 920 in the flow table 315. Once updated, the revalidator 316 can then retain the updated flow in the datapath cache.

In some embodiments, the time it takes to validate a flow depends on the complexity of the flow entries in the set of flow tables. That is, in addition to the specification of the physical forwarding element, the complexity of each flow can have an impact on the how long it takes to validate the flow. For instance, even if a matching flow is found in a flow table, the flow's associated actions may specify a resubmit operation to find another flow from the same flow table or another table. Thus, the physical forwarding element 305 may potentially have to perform a number of different look-up operations just to validate one flow from the datapath cache 325. This can affect the duration it takes to validate a given number of flow in the datapath cache 325, which in turn affects the dynamic calculation of the flows allowed in the datapath cache.

Figure 11:
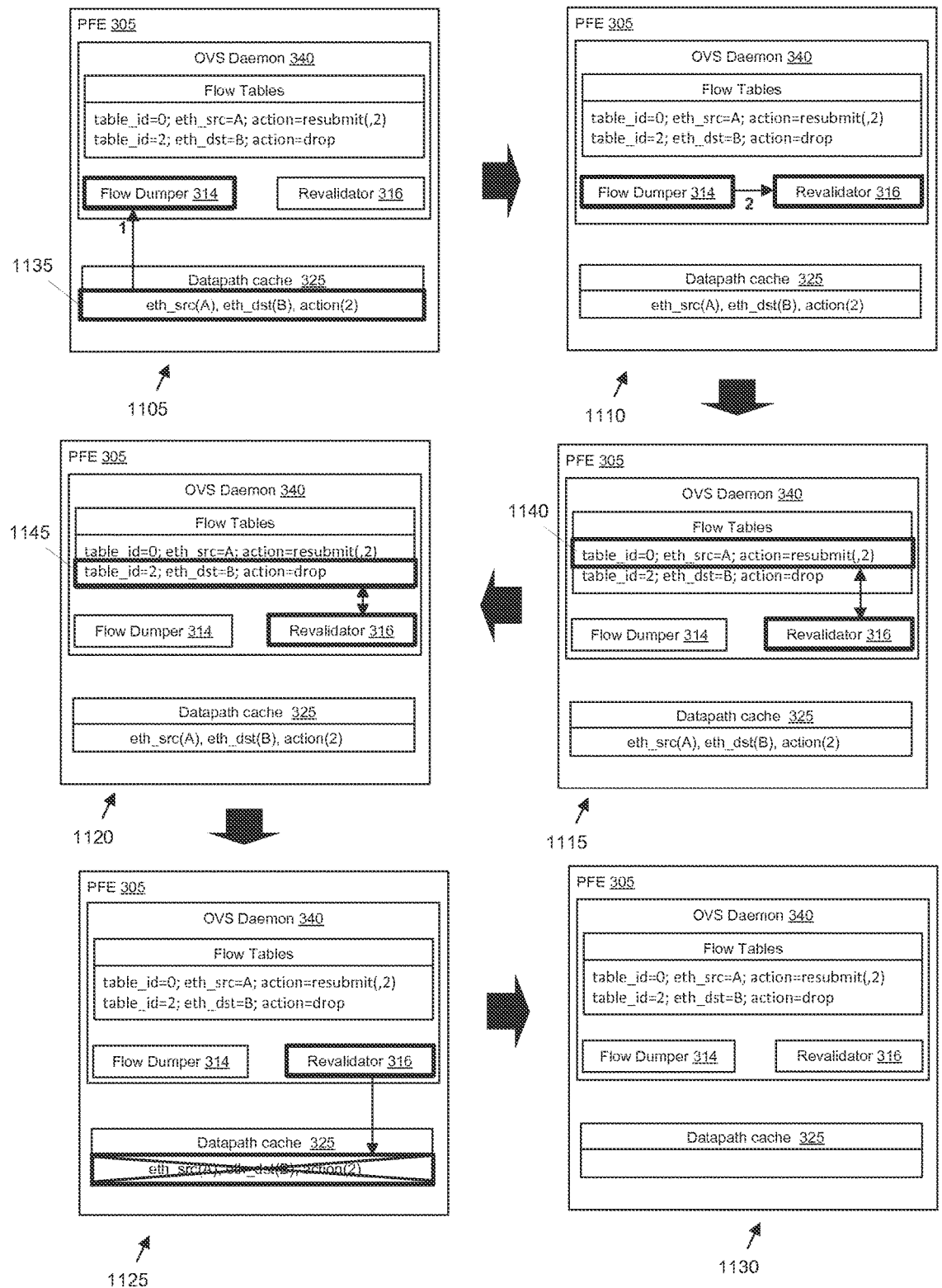
FIG. 11 provides an illustrative example of how the physical forwarding element of some embodiments validates a flow in a flow table cache.

FIG. 11 provides an illustrative example of how the physical forwarding element 305 of some embodiments validates a flow in the datapath cache. Six operational stages 1105-1130 of the physical forwarding element 305 are shown in the figure. In the first stage 1105, the flow dumper 314 retrieves the flow 1135 from datapath cache 325. The second stage 1110 shows that the flow dumper 314 selecting the revalidator 316 to validate the flow 1135.

The third stage 1115 shows the revalidator 316 validating the flow 1135 in the datapath cache 325. In the example of the third stage 1115, the set of match fields of the flow 1135 in the datapath cache 325 matches the set of match fields of the flow 1140 in a first flow table. However, the action associated with the flow 1140 specifies performing a resubmit operation to find another matching flow from a second flow table.

The fourth stage 1120 shows the revalidator 316 performing a look-up operation on the second table to find a matching flow. In the example, the set of match fields of the flow 1135 in the datapath cache 325 matches the set of match fields of the flow 1145 in the second flow table. However, the actions associated with the two flows 1135 and 1145 is different. Therefore, the revalidator 316 has determined that the flow 1135 in the datapath cache 325 is invalid. Accordingly, in the fifth stage 1125, the revalidator 316 deletes the flow 1135 from the datapath cache 325. The sixth stage 1130 shows the physical forwarding element 305 after deleting the flow 1135 from the datapath cache 325.

In addition to checking that the actions are correct, the revalidator 316 of some embodiment's checks that a mask associated with a megaflow has not changed. As mentioned above, the forwarding element of some embodiments supports flows in the datapath cache that may be fully specified, may contain one or more match fields (or a portion of the match field) that are wildcarded (e.g., masked), or may contain one or more match fields that are partially wildcarded. In some such embodiments, the forwarding element dynamically generates a flow with a set of wildcard fields based on one or more rules from one or more flow tables. The forwarding element then caches the flow entry and processes any subsequent packets that have header values that match the flow entry's non-wildcard match fields. In other words, each subsequent packet does not have to have header values that match all of the flow entry's match fields but only its non-wildcard fields. By generating a flow entry with such wildcard fields, the forwarding element does not have to generate a new flow entry when it receives a similar packet with one or more different header values. The switching element can continue to process such a similar packet as long as its header values match the non-wildcard fields. The wildcard flow is also referred to as a megaflow because it allows packets that have different wildcard values to be quickly processes. In other words, this caching now collapses similar flows into one userspace "megaflow" that makes many flow misses a cache lookup instead of a full translation. In some embodiments, if the forwarding element allows installation of such megaflows in the datapath cache, the revalidator process also checks that the megaflow mask has not changed. If the mask has changed, the revalidator removes the flow from the datapath cache.

Figure 12:
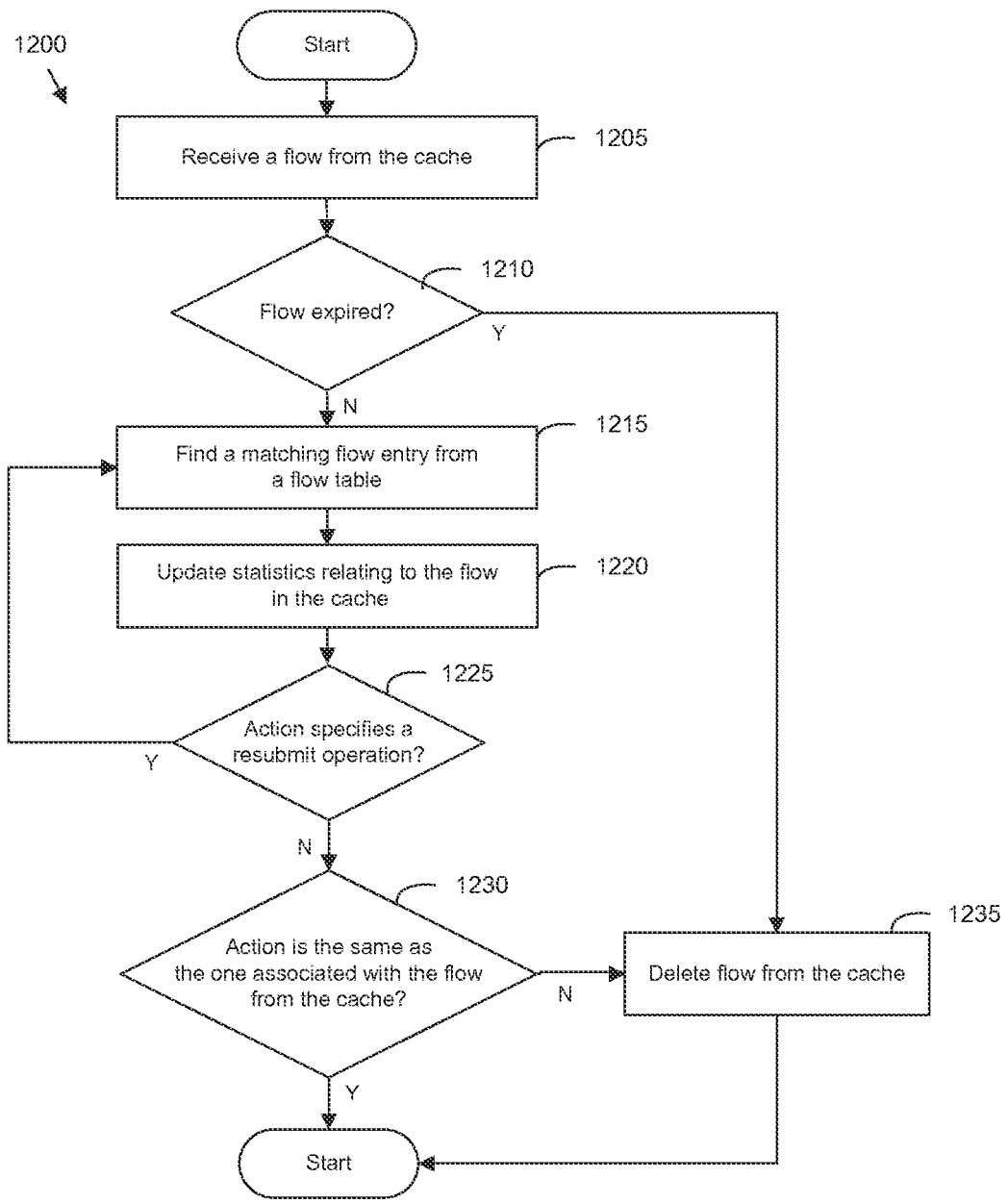
FIG. 12 conceptually illustrates asset of operations that some embodiments perform when validating a flow from a flow table cache.

FIG. 12 conceptually illustrates a set of operations that some embodiments perform when validating a flow from a cache. In some embodiments, the process 1200 is performed by the physical forwarding element. For instance, the process 1200 might be performed a revalidator that operates on the physical forwarding element.

As shown, the process 1200 begins when it receives (at 1205) a flow from the cache. The process 1200 then determines (at 1210) whether the flow has expired. For instance, if a set period of time has passed or the flow has not been used for a set period of time, the process 1200 may delete the flow from the cache. This feature prevents the datapath cache from being filled with potentially many flows that has not been used for some time.

In some embodiments, the flows eviction process 1200 takes into account the number of flows that are stored in the cache. As an example, if a physical forwarding element is not heavily loaded, a flow will stay in the cache if it was not used within a particular time period (e.g., three or five seconds). If the flow was not used within the particular time period, the flow may be dropped from the cache. Once the flows in the cache reach a certain threshold limit, the physical forwarding element may dynamically adjust how long a flow stays in the cache. For example, if the cache is heavily loaded, a flow might only last some milliseconds (e.g., a hundred milliseconds) if it was not used. In some embodiments, a userspace component makes the decisions about how long a flow stays in the cache based on how recently it was used and/or the amount of flows in the datapath cache.

As shown in FIG. 12, if the flow has expired, the process 1200 deletes (at 1235) the flow from the cache. The process 1200 then ends. If the flow has not expired, the process 1200 proceeds to 1215. At 1215, the process 1200 performs a look-up operation and finds a matching flow from a flow table. The process 1200 of some embodiments can utilize one of a number of different classification algorithms when looking for one or more matching flows. In some embodiments, the process 1200 uses a tuple search algorithm to find a matching flow. In some embodiments, the process 1200 uses a staged lookup algorithm to search for one or more matching flows. The process 1200 may use a decision tree algorithm to perform the classification operations, or some variation of the decision tree algorithm. All of these example algorithms are described above by reference to FIG. 4. However, different from the examples described above, the classification algorithm compares a set of match fields associated with a flow in the datapath cache, instead of a set of header fields associated with a packet.

After a matching flow entry is found, the process 1200 updates (at 1220) statistics relating to the flow in the cache. The process 1200 of some embodiments updates at least one of several different types packet counters. First, there's a packet counter associated with each rule (e.g., OpenFlow rule). When performing the validating, the process 1200 of some embodiments examines the number of packets and bytes sent, and which one or more rules (e.g., OpenFlow rules) from the flow table were used to generate the flow in the datapath cache. For those rules (e.g., OpenFlow rules), the process 1200 of some embodiments increments the packet and byte counters. The counters are updated so that users (e.g., end-users) can use this information for debugging purposes later. Another place where the packet and byte counters could be potentially used are for one or more different types of interfaces which don't track RX and TX counters on their own, tunnels and patch ports specifically. For example, if a particular data path flow comes in on a tunnel, or outputs to a tunnel, the process 1200 of some embodiments increases the receive (TX) or transmit (RX) counter by the number of packets in the flow. The information can be used for informational purposes, debugging, accounting etc.

The process 1200 then determines (at 1225) whether the flow entry is associated with a resubmit action. If so, the process 1200 returns to 1215, which is described above, Otherwise, the process 1200 determines (at 1230) whether the action associated with the flow entry from the flow table is the same as the one associated with the flow from the cache. If they are different, the process 1200 deletes (at 1235) the flow from the cache. The process 1200 then ends. If they are the same, the process 1200 retains the flow in the cache. The process 1200 then ends.

Some embodiments perform variations on the process 1200. The specific operations of the process 1200 may not be performed in the exact order shown and described. The specific operations may not be performed in one continuous series of operations, and different specific operations may be performed in different embodiments.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
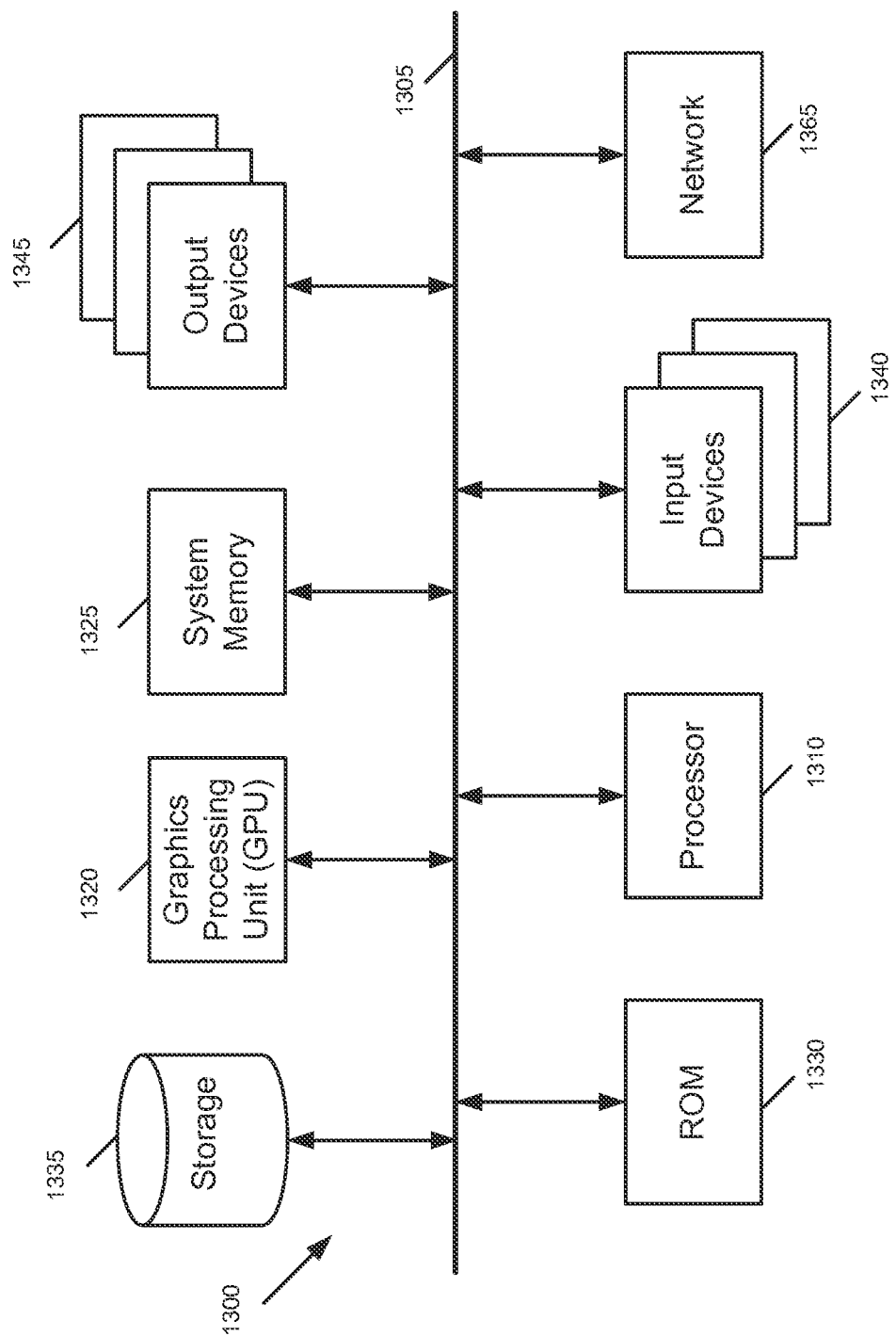
FIG. 13 conceptually illustrates an electronic system with which some embodiments of the invention are implemented.

FIG. 13 conceptually illustrates an electronic system 1300 with which some embodiments of the invention are implemented. The electronic system 1300 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1325, and the permanent storage device 1335.

From these various memory units, the processing unit(s) 1310 retrieves instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash memory device, etc., and its corresponding drive) as the permanent storage device. Like the permanent storage device 1335, the system memory 1325 is a read-and-write memory device. However, unlike storage device 1335, the system memory 1325 is a volatile read-and-write memory, such a random access memory. The system memory 1325 stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1, 5, and 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine readable medium storing a program that when executed by at least one processing unit processes packets, the program comprising sets of instructions for:
   generating and installing flow entries in a cache, wherein each flow entry is generated using at least one flow entry, from a flow table, that specifies performing a set of actions on incoming packets; and
   validating one or more of the flow entries that are installed in the cache by determining whether a set of actions in each flow entry matches a set of actions of a corresponding flow entry in the flow table, said validating comprising:
      for each flow entry in the cache in which the set of actions matches the set of actions of a corresponding flow entry in the flow table, maintaining the flow entry in the cache; and
      for each flow entry in the cache in which the set of actions does not match the set of actions of a corresponding flow entry in the flow table, removing or modifying the flow entry in the cache;
   wherein said generating and installing flow entries are executed in a first execution thread and said validating, removing, and modifying are executed in a second, different execution thread.

2. The non-transitory machine readable medium of claim 1, wherein the program further comprises a set of instructions for:
   determining whether each flow entry has expired; and
   removing a flow entry from the cache when the flow entry has expired.

3. The non-transitory machine readable medium of claim 2, wherein the program further comprises a set of instructions for determining that a flow entry has expired when the flow entry has not been used to process a packet in a set time period.

4. The non-transitory machine readable medium of claim 1, wherein the set of instructions for validating each particular flow entry in the cache comprises a set of instructions for finding a flow entry in the flow table that matches the particular flow entry's match fields and determining if a set of actions associated with the flow entry matches the set of actions associated with the particular flow entry.

5. The non-transitory machine readable medium of claim 4, wherein the set of instructions for modifying each particular flow entry in the cache that has a different set of actions comprises a set of instructions for changing the set of actions associated with the particular flow entry to be the same as the set of actions associated with the flow entry in the flow table when the sets of actions are different.

6. The non-transitory machine readable medium of claim 1, wherein the program further comprises a set of instructions for updating statistics relating to the flow entry.

7. The non-transitory machine readable medium of claim 6, wherein the statistics comprises at least one of a packet counter and a byte counter.

8. The non-transitory machine readable of claim 1, wherein the program further comprises a set of instructions for iterating through each flow entry in the cache.

9. The non-transitory machine readable of claim 1, wherein the program further comprises sets of instructions for:
   finding a matching flow for a packet in the cache; and
   generating and installing a flow entry in the cache that corresponds to the packet when a matching flow is not found in the cache.

10. A method of processing packets, the method comprising:
    generating and installing flow entries in a cache, wherein each flow entry is generated using at least one flow entry, from a flow table, that specifies performing a set of actions on incoming packets; and
    validating one or more of the flow entries that are installed in the cache by determining whether a set of actions in each flow entry matches a set of actions of a corresponding flow entry in the flow table, said validating comprising:
       for each flow entry in the cache in which the set of actions matches the set of actions of a corresponding flow entry in the flow table, maintaining the flow entry in the cache; and
       for each flow entry in the cache in which the set of actions does not match the set of actions of a corresponding flow entry in the flow table, removing or modifying the flow entry in the cache;
    wherein said generating and installing flow entries are executed in a first execution thread and said validating, removing, and modifying are executed in a second, different execution thread.

11. The method of claim 10 further comprising:
    determining whether each flow entry has expired; and
    removing a flow entry from the cache when the flow entry has expired.

12. The method of claim 10 further comprising determining that a flow entry has expired when the flow entry has not been used to process a packet in a set time period.

13. The method of claim 10, wherein validating each particular flow entry in the cache comprises finding a flow entry in the flow table that matches the particular flow entry's match fields and determining if a set of actions associated with the flow entry matches the set of actions associated with the particular flow entry.

14. The method of claim 13, wherein modifying each particular flow entry in the cache that has a different set of actions comprises changing the set of actions associated with the particular flow entry to be the same as the set of actions associated with the flow entry in the flow table when the sets of actions are different.

15. The method of claim 10 further comprising updating statistics relating to the flow entry.

16. The method of claim 15, wherein the statistics comprises at least one of a packet counter and a byte counter.

17. The method of claim 10 further comprising iterating through each flow entry in the cache.

18. The method of claim 10 further comprising:
 finding a matching flow for a packet in the cache; and
 generating and installing a flow entry in the cache that corresponds to the packet when a matching flow is not found in the cache.

\* \* \* \* \*